(12) United States Patent
Pratt

(10) Patent No.: US 7,906,191 B2
(45) Date of Patent: *Mar. 15, 2011

(54) WAVY COMPOSITE STRUCTURES

(75) Inventor: William F. Pratt, Pleasant Grove, UT (US)

(73) Assignee: William F. Pratt, Cedar City, UT (US)

( * ) Notice: Subject to any disclaimer, the term of this patent is extended or adjusted under 35 U.S.C. 154(b) by 1309 days.

This patent is subject to a terminal disclaimer.

(21) Appl. No.: 10/433,198

(22) PCT Filed: Nov. 30, 2001

(86) PCT No.: PCT/US01/45354
§ 371 (c)(1),
(2), (4) Date: May 29, 2003

(87) PCT Pub. No.: WO02/43947
PCT Pub. Date: Jun. 6, 2002

(65) Prior Publication Data
US 2004/0048022 A1    Mar. 11, 2004

Related U.S. Application Data

(63) Continuation-in-part of application No. 09/952,089, filed on Sep. 10, 2001, now abandoned, which is a continuation-in-part of application No. 09/238,873, filed on Jan. 27, 1999, now Pat. No. 6,287,664, and a continuation-in-part of application No. 08/970,141, filed on Nov. 14, 1997, now Pat. No. 6,048,426.

(60) Provisional application No. 60/072,975, filed on Jan. 29, 1998, provisional application No. 60/251,094, filed on Dec. 1, 2000, provisional application No. 60/240,645, filed on Oct. 16, 2000.

(51) Int. Cl.
*F16F 1/14* (2006.01)
*B32B 1/08* (2006.01)
*B32B 5/02* (2006.01)

(52) U.S. Cl. ............... 428/36.9; 52/167.8; 52/786.1; 473/316; 473/318; 473/319; 267/257; 280/610; 43/18.5; 464/180; 464/181; 180/902

(58) Field of Classification Search .............. 428/36.9, 428/36, 91, 174; 52/167.8, 786.1; 473/316, 473/318, 319, 520, 521; 267/257; 280/18, 280/601, 610; 441/68, 74; 43/18.1, 18.5; 464/180, 181; 180/902
See application file for complete search history.

(56) References Cited

U.S. PATENT DOCUMENTS

| 6,048,426 A * | 4/2000 | Pratt ........................ 156/177 |
| 6,155,932 A * | 12/2000 | Cabales et al. ........... 473/319 |
| 6,287,664 B1 * | 9/2001 | Pratt ........................ 428/68 |

* cited by examiner

*Primary Examiner* — D. Lawrence Tarazano
*Assistant Examiner* — Michael Wilson

(57) ABSTRACT

Construction and advantages of improved wavy composite structures made from wavy composite, unidirectional composites, and damping materials is revealed. By combining wavy composite laminae in various waveforms, offsets, angular orientations and material combinations, it is possible to provide axial, torsion, or shear properties equivalent to unidirectional materials but without the limitations related to fiber discontinuity, labor costs for fabrication, and weakness at seams where laminates overlap. By combining wavy composite layers with unidirectional crossplies, or by using woven mats with various fill fiber levels where the warp fibers are sinuously arranged, improved strength and damping is possible. Several examples of both wavy crossply laminates and unidirectional crossply laminates are analyzed and compared.

8 Claims, 22 Drawing Sheets

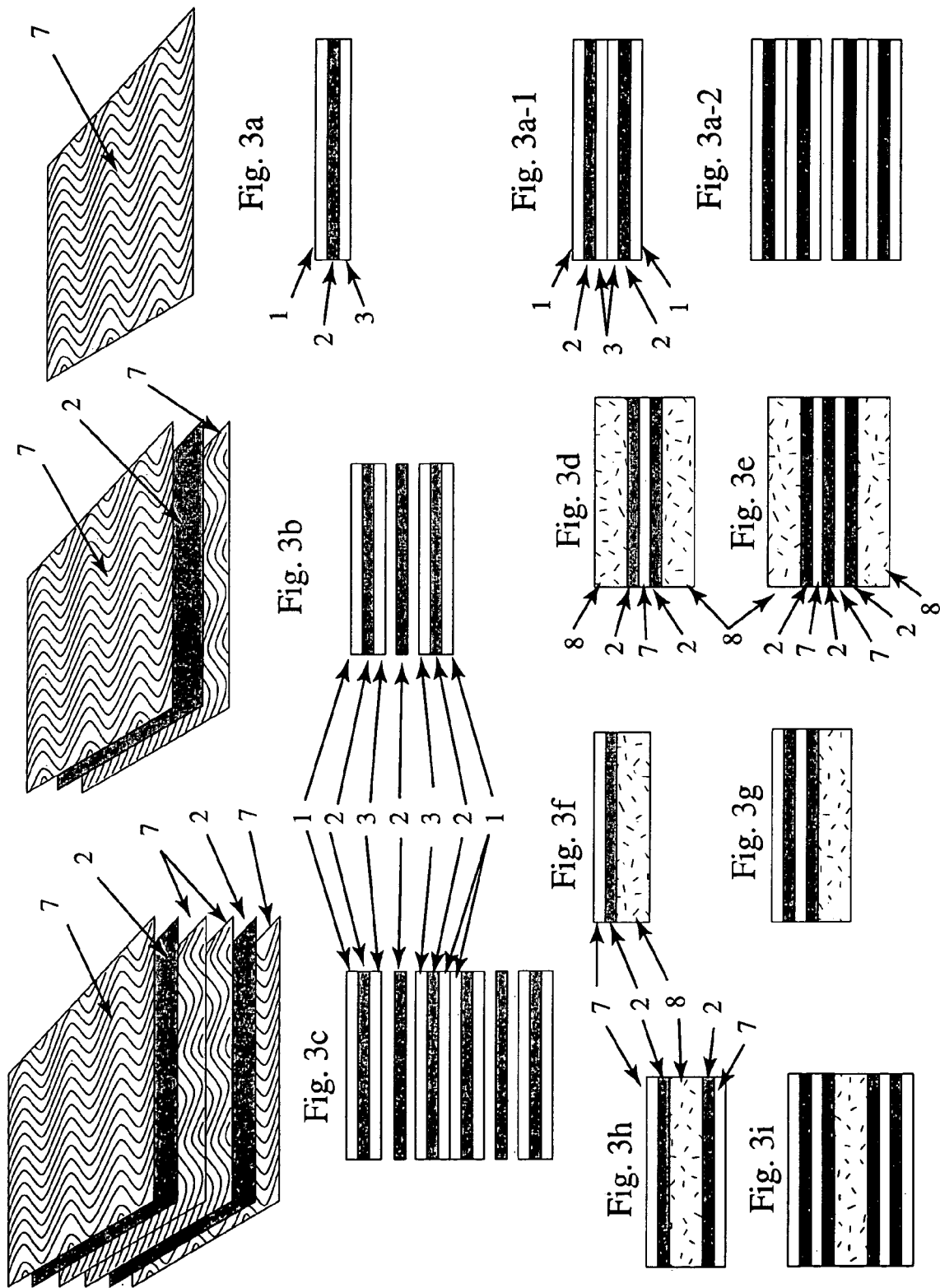

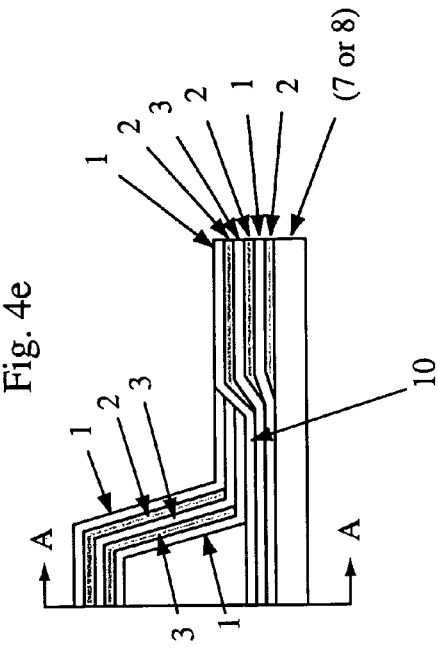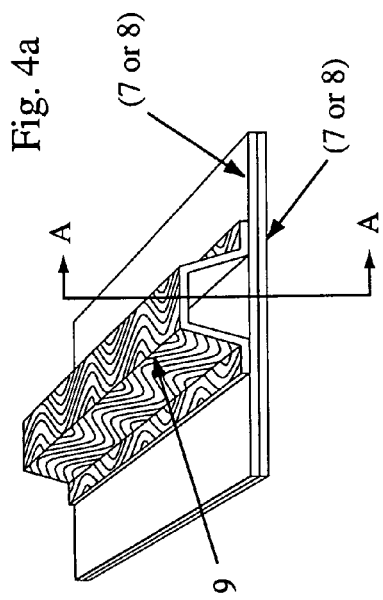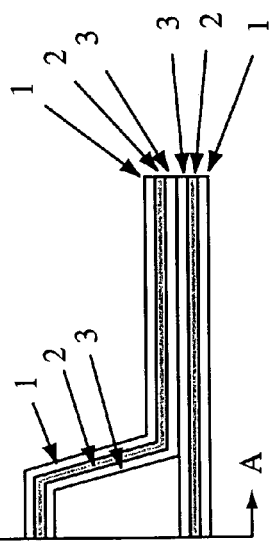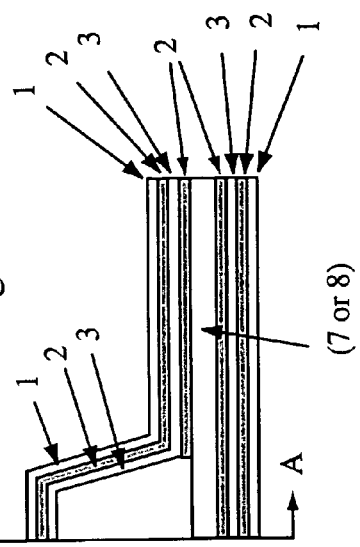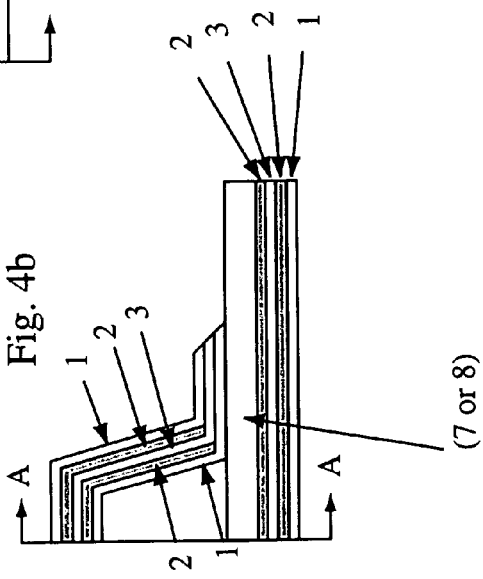

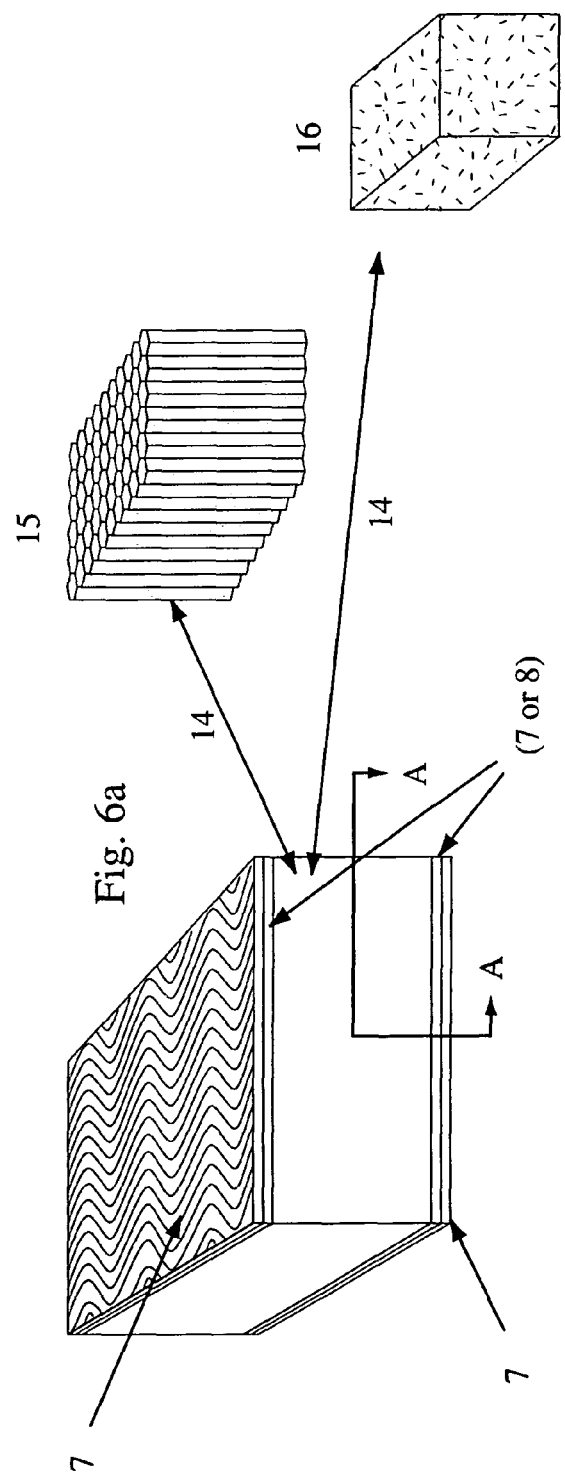
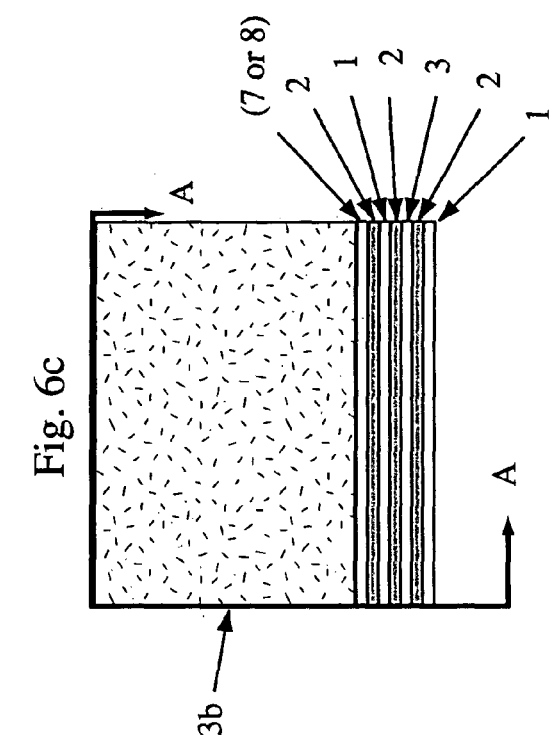
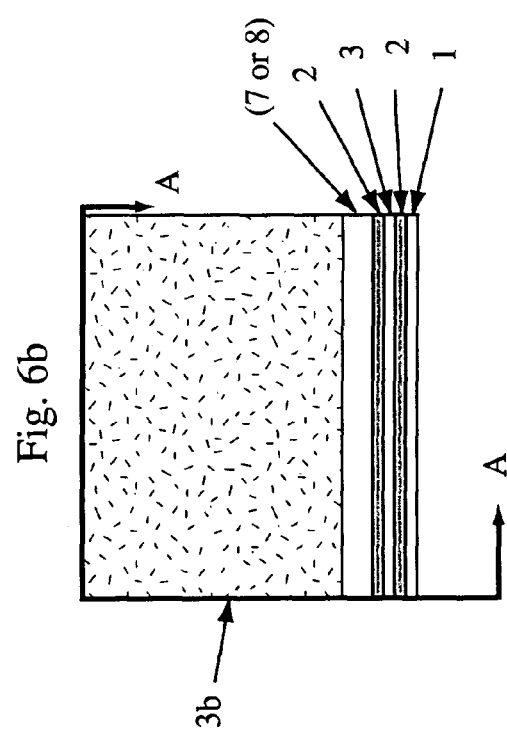
Fig. 6a
Fig. 6b
Fig. 6c

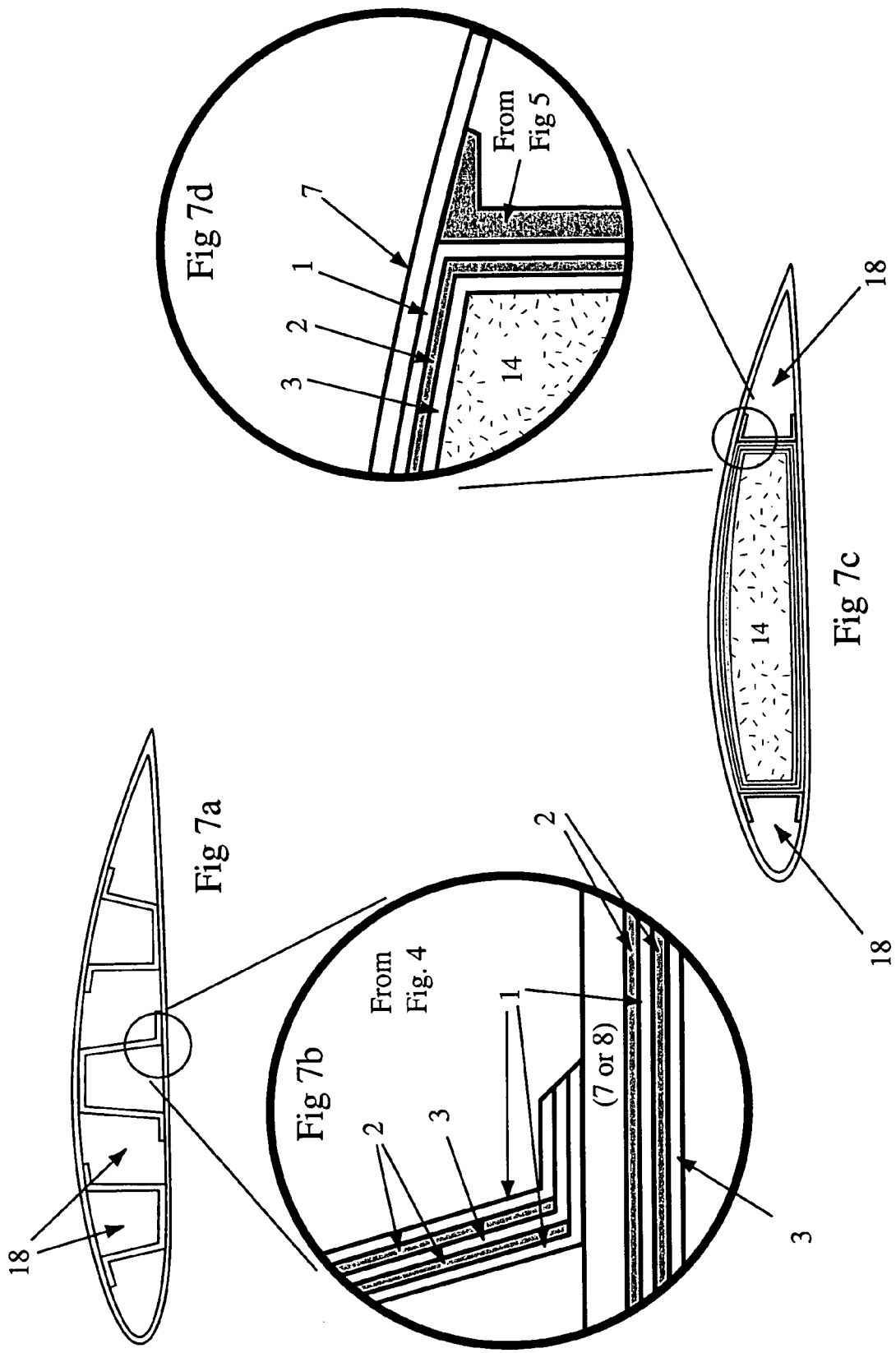

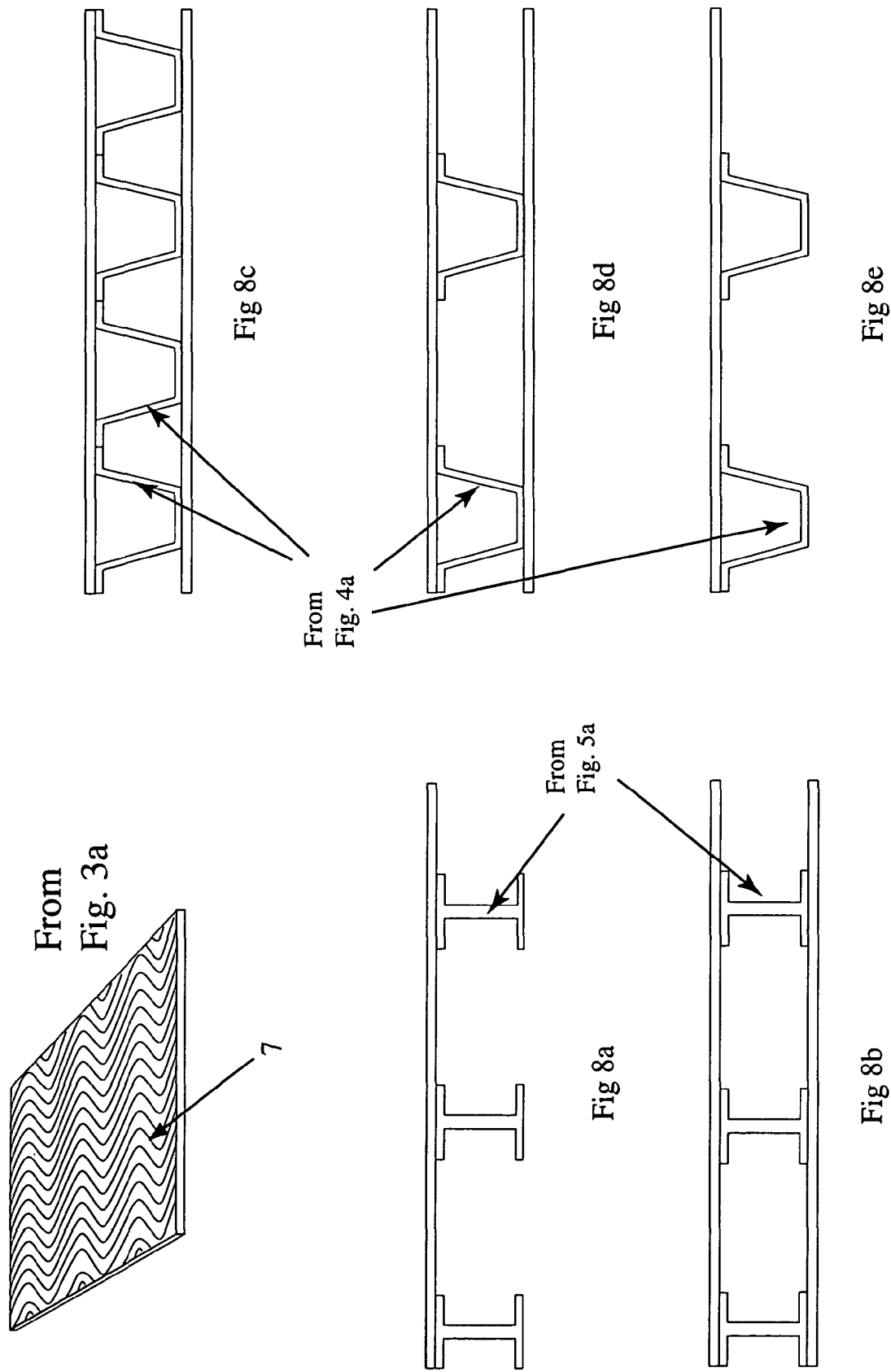

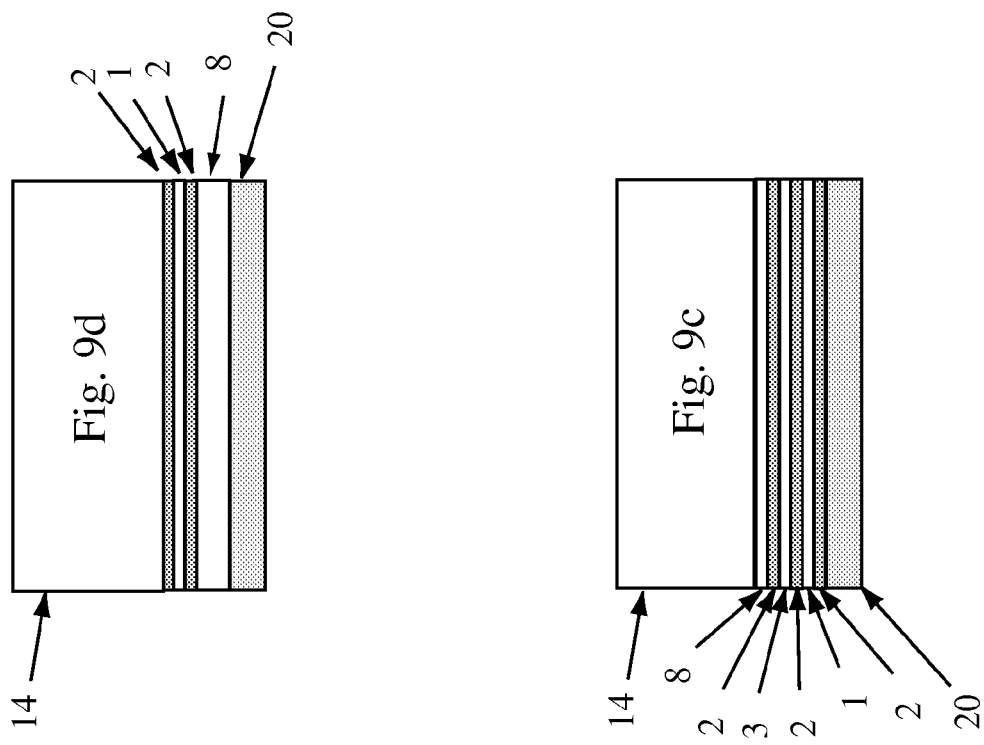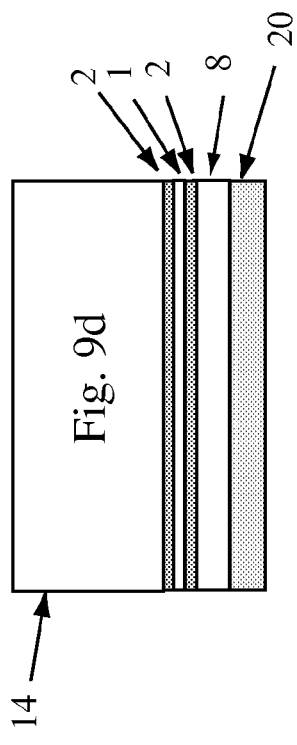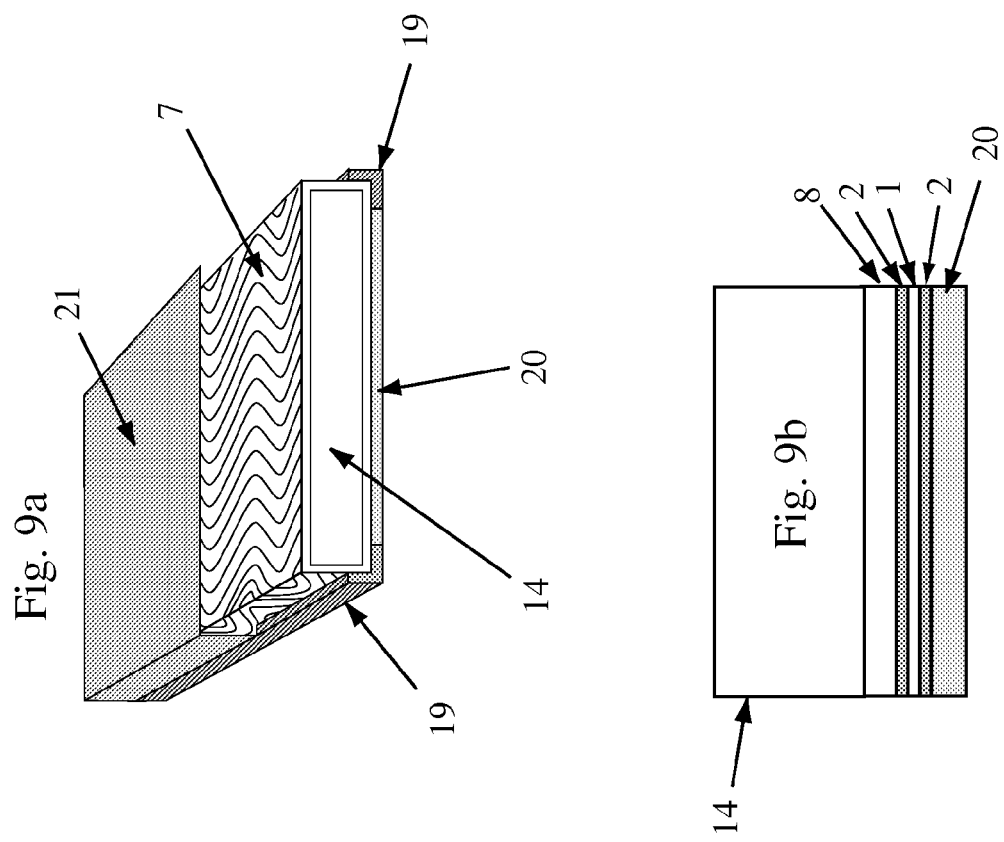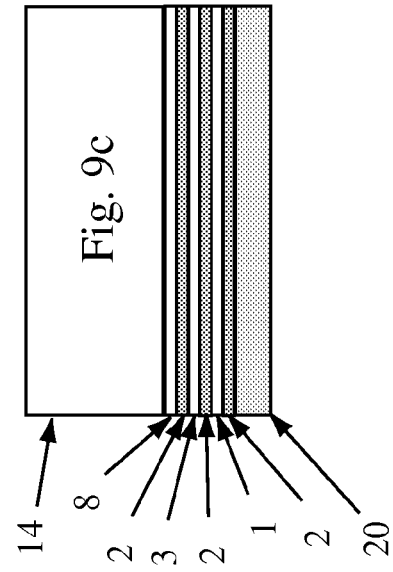

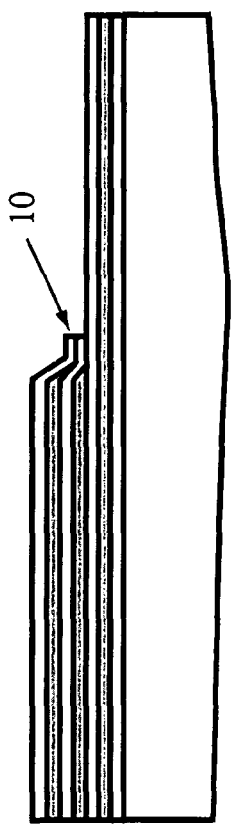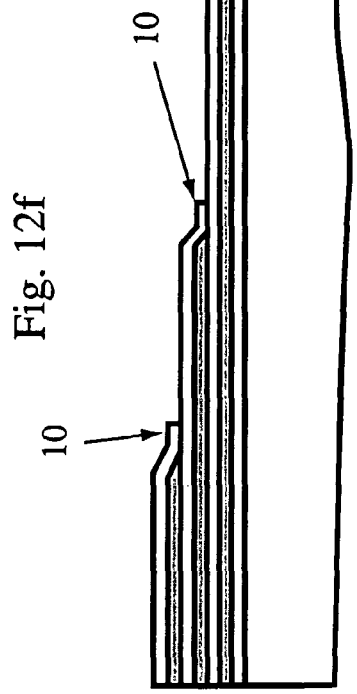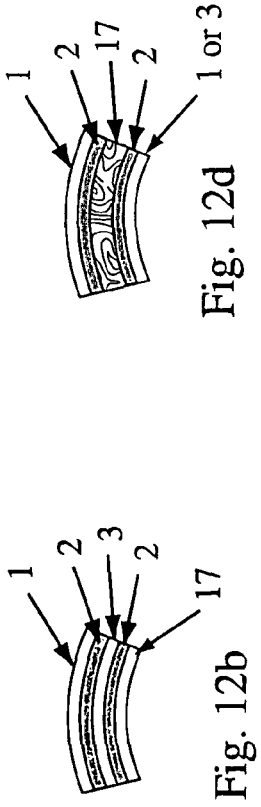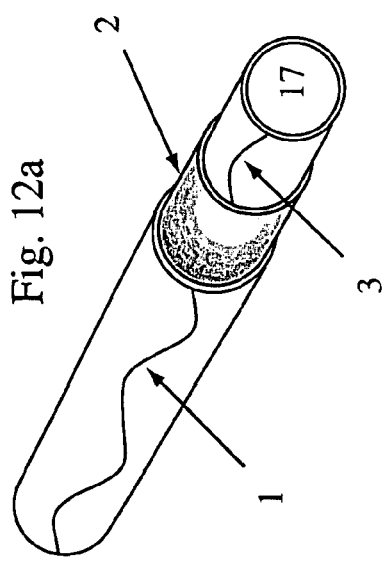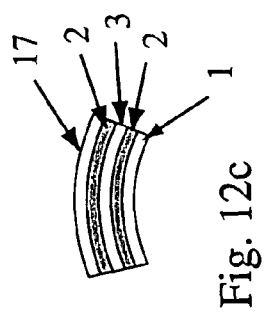

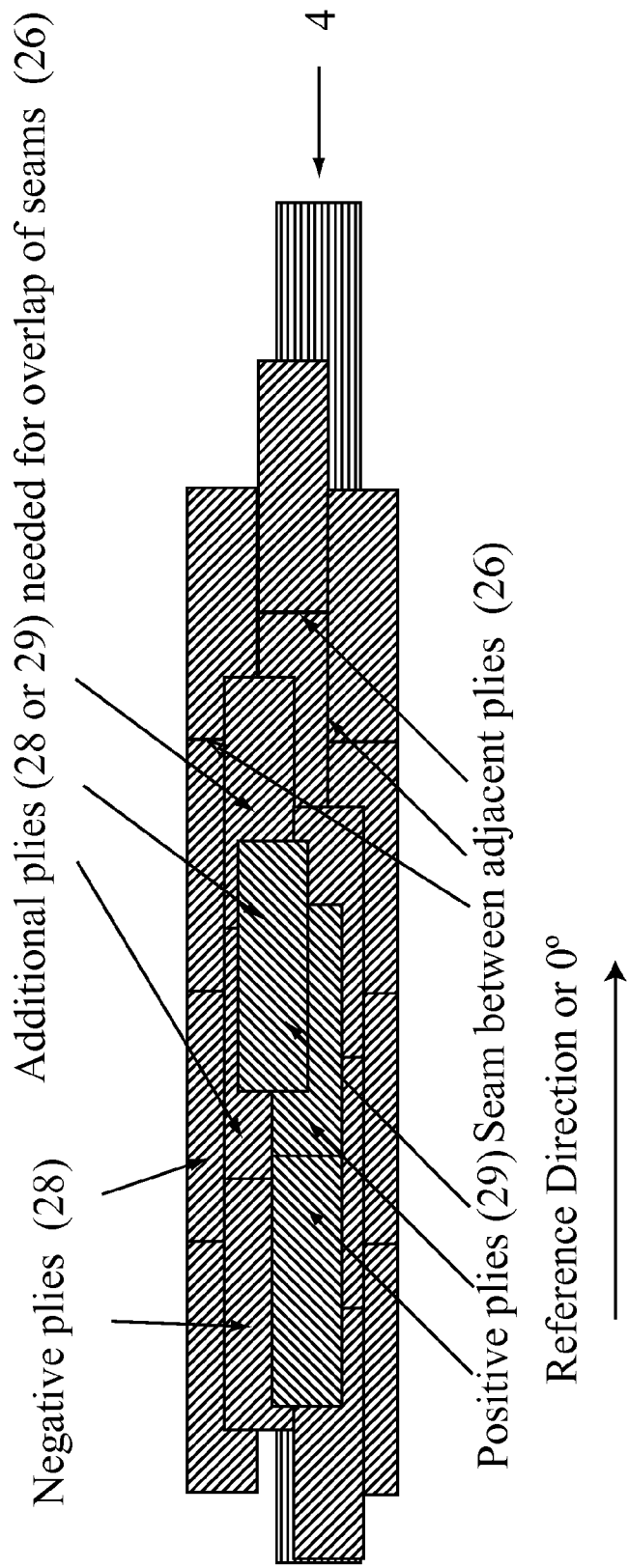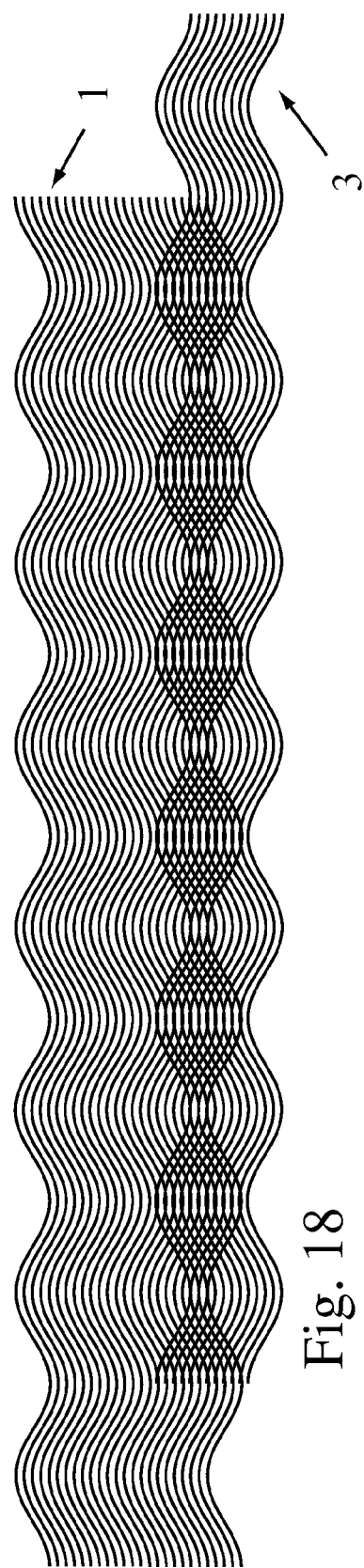
Fig. 18

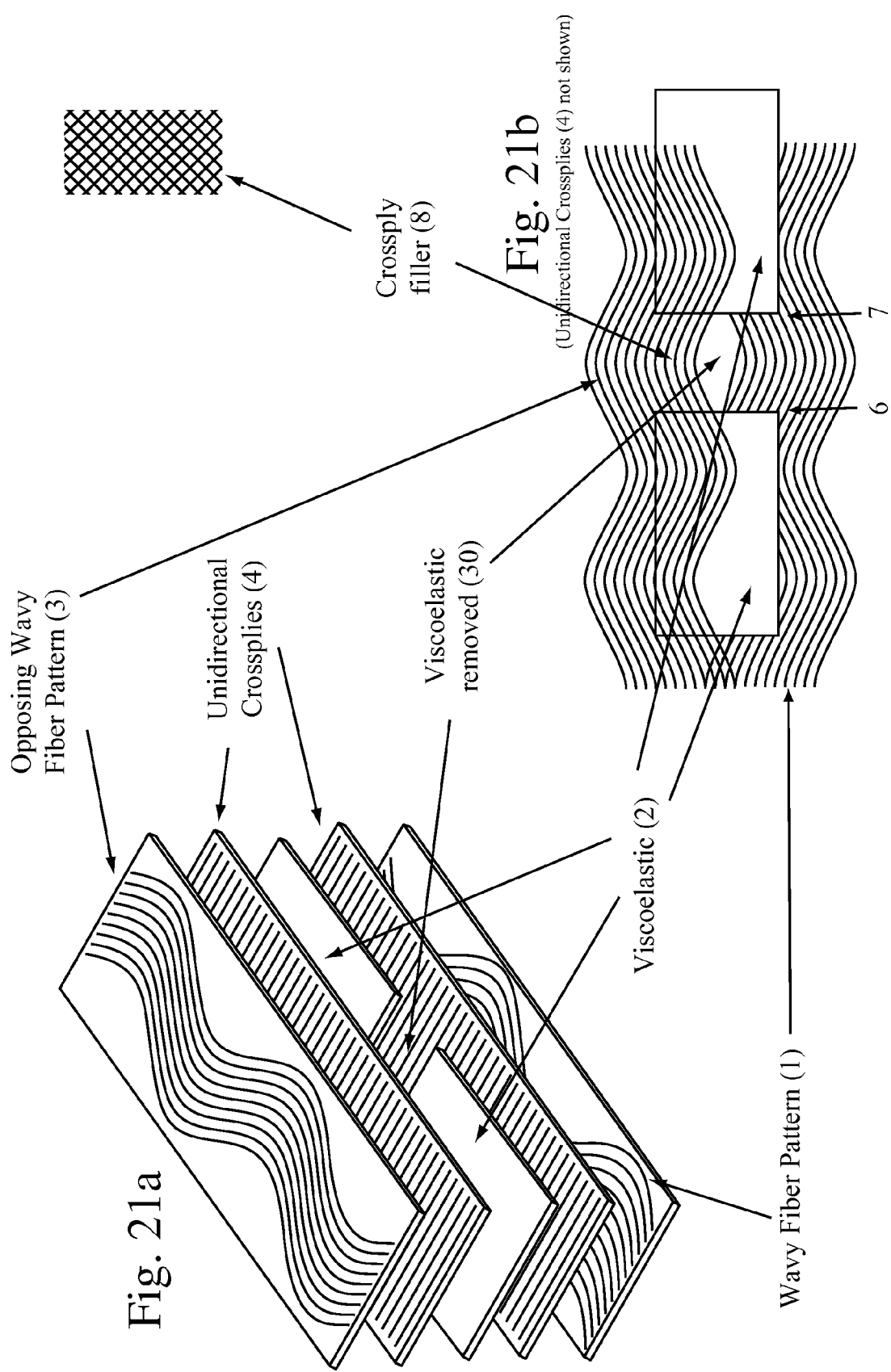

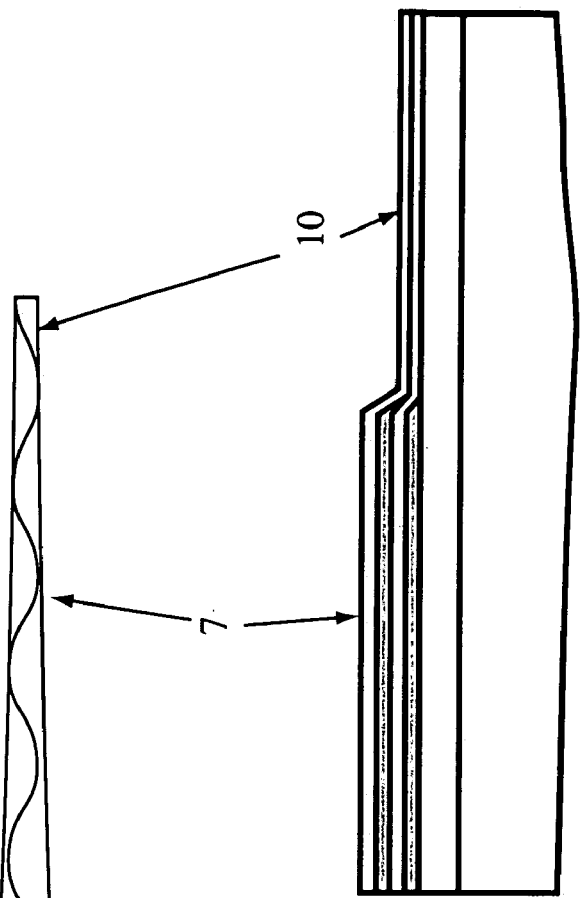
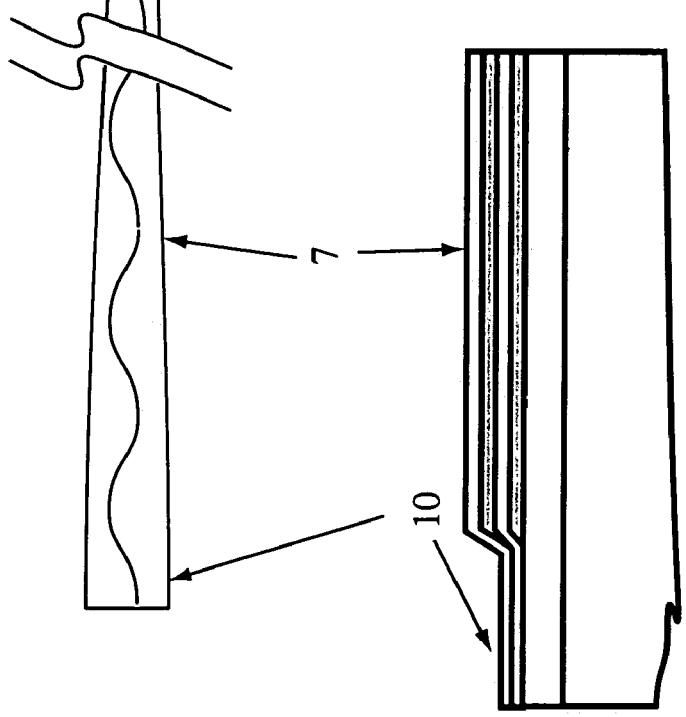
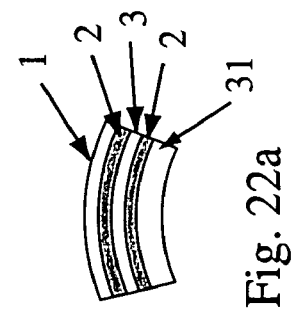
Fig. 22b
Fig. 22d
Fig. 22c
Fig. 22a

WAVY COMPOSITE STRUCTURES

This application is a continuation-in-part of application Ser. No. 09/952,089, filed Sep. 10, 2001, now abandoned which is a continuation-in-part of application Ser. No. 09/238,873, filed Jan. 27, 1999, now U.S. Pat. No. 6,287,664, which claims the benefit of provisional Application No. 60/072,975, filed Jan. 29, 1998, and which is a continuation-in-part of application Ser. No. 08/970,141, filed Nov. 14, 1997, now U.S. Pat. No. 6,048,426; application Ser. No. 09/952,089 also claims the benefit of provisional Application No. 60/240,645, filed Oct. 16, 2000, provisional Application No. 60/251,094, filed on Dec. 1, 2000.

TECHNICAL FIELD

The present invention relates to fiber reinforced resin matrix composites, and more particularly, to improved crossply laminate structures made from wavy composite materials. Such materials and structures made from wavy composites have enhanced structural properties including improved damping, stiffness, strength, and represent a greatly enhanced method of manufacturing damped laminates.

BACKGROUND ART

The control of noise and vibration in composite structures is an important area of current research in aerospace, automotive and other industries. For example, spacecraft vibrations initiated by attitude adjusting thrusters, motors and thermally induced stresses inhibit accurate aiming of antennas and other equipment carried by the craft. Such vibrations can cause severe damage to the craft and its associated equipment. Fatigue failure of structural components can occur at stresses well below static load limits.

Composite materials have been used to construct a wide variety of structural elements, including tubes, enclosures, beams, plates and irregular shapes. Objects as diverse as rocket motor housings and sporting goods, notably golf club shafts, skis, archery arrows, vaulting poles and tennis rackets have been structured from composite materials. While composite constructions have offered many significant advantages, such as excellent strength and stiffness properties, together with lightness and chemical resistance, the poor vibration damping properties of such construction have been of concern.

The invention relates to fiber reinforced composite structures and applications that use wavy fiber patterns in the plane of the laminate, and that increase damping with little or no sacrifice in strength.

The present invention relates to fiber reinforced resin matrix composites, and more particularly, to improved crossply laminate structures made from wavy composite materials. Such materials and structures made from wavy composites have enhanced structural properties and represent a greatly enhanced method of manufacturing crossply laminates.

The present invention relates to fiber reinforced resin matrix composites, and more particularly, to improved tubular wavy composite based laminate structures with high damping, and improved torsional properties. The present invention relates to a generalized tubular wavy composite structure that is easier to manufacture, and can be used to create high quality, high capability, golf club shafts, baseball bats, automotive drive shafts, helicopter drive shafts, fishing rods, oil drilling pipe, and other tubular or structural members where damping, stiffness, and strength are important.

The present invention relates to fiber reinforced resin matrix composites, and more particularly, to improved wavy composite based laminate plates and other structures with high damping, and improved torsional properties. The present invention relates to a generalized wavy composite laminate structure that is easier to manufacture, and can be used to create high quality, high capability, panels, skis, snowboards, wing skins, fuselage components, and other structural members where damping, stiffness, and strength are important.

The following terms used herein will be understood to have their ordinary dictionary meaning as follows:

| | |
|---|---|
| Composite: | made up of distinct parts. In the general sense, refers to any fiber reinforced material but especially any cured fiber reinforced matrix structure. |
| Crossply, crossply lay-up, or crossply laminate: | Two or more laminae made from unidirectional pre-preg arranged in such a manner that the primary direction of the fiber or strong material direction in the layers differ in orientation, or "cross" each other. |
| Fiber: | a thread or a structure or object resembling a thread. A slender and greatly elongated natural or synthetic filament. (Includes metal fibers) |
| Lamina(te): | a thin plate . . . : layer(s) |
| Matrix: | material in which something is enclosed or embedded. |
| Offset: | In the context of this invention, means a generalized lead or lag of one waveform relative to another, similar to a phase angle in electronic engineering. |
| Off-axis: | In the context of this invention, means a rotational difference of the strong axis between one laminae waveform relative to another or some reference. |
| Pre-preg: | Fiber reinforced, resin matrix impregnated materials where the matrix is partially cured and ready for use. A special "uncured" case of the more general term "Composite". |
| Resin: | an uncured binder, especially an uncured polymer binder or matrix used to bind fibers or fibrous materials; the matrix component of an uncured pre-preg. |
| Viscoelastic: | having appreciable and conjoint viscous and elastic properties. Note: a special case of the term "viscoelastic" is "anisotropic viscoelastic", which is a viscoelastic material reinforced with fibers that give the material anisotropic properties. When the term viscoelastic is used in the text it should be construed to encompass this special case. |
| Wavy: | The pattern of fiber lay that has a sinusoidal look, especially a |

| | |
|---|---|
| Wavy composite, Wavy prepreg: | sinuous wavy fiber in the plain of a laminate; the wave pattern need not be periodic or uniform. defines any fiber-matrix combination having at least one fiber without a break (or interruption) and having a pattern which can be defined by a mathematical algorithm. It generally has a wavy appearance. It can consist of "unidirectional" fibers (although in this case the fibers would be placed in a wavy pattern) or woven cloth (which also will have a wavy pattern to the warp or weft and substantially straight fill fibers). This definition includes the use of substantially straight fibers that are arranged generally perpendicular to the generalized lay of the sinuous fibers and specifically includes a woven cloth were the warp fibers are sinuous and the fill fibers are straight and substantially perpendicular. Of course were the angle of the sinuous fiber deviates from zero degrees (to the generalized lay) the angle between sinuous warp fibers and straight fill fibers will not be exactly perpendicular. |
| Wavy crossply, wavy crossply lay-up, or wavy crossply laminate: | Two or more wavy fiber laminae arranged in such a manner that the primary direction of the fiber or strong material direction in the layers differ in orientation. |
| CWCV: | (Continuous Wave Composite Viscoelastic) defines a combination of wavy composite and viscoelastic materials designed to induce damping in a structure. |
| CWC-AV: | (Anisotropic Viscoelastic) defines a viscoelastic material or matrix with an embedded wavy fiber pattern. Such a material would have anisotropic, elastic, and viscoelastic properties. It is a special case of both CWC laminates and "viscoelastic" and can be used in conjunction with conventional CWC fiber-matrix combinations to provide damping and unique structural properties. Any use of "CWC" or "viscoelastic" in the following text can be construed to encompass this special case. |

One of the simplest and often very effective passive damping treatments involves the use of thermo-viscoelastic (TVE) materials. These materials, represented by Avery-Dennison's FT series (FT-1191 is one example), exhibit both elastic and dissipative qualities which make them useful in a number of passive damping treatments.

Co-cured composite-viscoelastic structures are formed when layers of uncured fiber composites and TVE (thermal-viscoelastic or viscoelastic) materials are alternately stacked and cured together in an oven. Damping occurs in these structures when a load causes differential movement of the opposing laminates, causing shearing in the sandwiched viscoelastic material. The various methods that use this concept of differential shearing of the viscoelastic material can be classified by the fiber orientation methods used to induce damping in the TVE material.

Conventional angled ply composite designs use ±θ lay-ups of straight fiber pre-preg materials to encase the viscoelastic layers, and were first proposed by Barrett (1989) in a design for damped composite tubular components. Barrett combined the concepts of constrained layer damping with anisotropic shear coupling in the constraining composite layers to create a tube that achieved both high damping and high axial stiffness. Barrett's research showed that maximum shearing was experienced at the ends of the tubes and that clamping the constraining layers of the tube at the ends eliminated much of the damping effect, rendering the design impractical for most applications.

Chevron patterned designs also use conventional angled ply (±θ) composite lay-ups of straight fibers but vary the fiber orientation several times throughout the structure in a given laminate. Called SCAD (Stress Coupled Activated Damping), it was first proposed by Benjamin Dolgin of NASA and implemented by Olcott et al. (1991a).

In Olcott's implementation of Dolgin's design, each composite layer is comprised of multiple plies of pre-preg composite material arranged in a series of chevron-like patterns. Each composite layer is also comprised of several "segments" of material where the fiber angle in a given segment is oriented in a single direction throughout its thickness. Segments on opposite sides of the embedded viscoelastic material have the opposite angular orientation. At least two adjacent segments in a given composite layer are required to form a chevron and are joined together by staggering and overlapping the pre-preg plies in the segment.

By tailoring the fiber angle, thickness, and segment lengths, significant shearing in the viscoelastic layer was observed over the entire structure, not just at the ends as in Barrett's design (Olcott et al., 1991b; Olcott, 1992).

The following publications, incorporated herein by reference, are cited for further details on this subject.

1. Cabales, Raymund S.; Kosmatka, John B.; Belknap, Frank M., "Golf shaft for controlling passive vibrations," 1999, U.S. Pat. No. 5,928,090.
2. Cabales, Raymund S.; Kosmatka, John B.; Belknap, Frank M., "Golf shaft for controlling passive vibrations," 2000, U.S. Pat. No. 6,155,932.
3. Dolgin, Benjamin P., "Composite Passive Damping Struts for Large Precision Structures," 1990, U.S. Pat. No. 5,203,435.
4. Dolgin, Benjamin P., "Composite Struts Would Damp Vibrations," NASA Technical Briefs, 1991, Vol. 15, Issue 4, p. 79.
5. Easton, James L.; Filice, Gary W.; Souders, Roger; Teixeira, Charles, "Tubular metal ball bat internally reinforced with fiber composite," 1994, U.S. Pat. No. 5,364,905.
6. Hyer, M. W. (1997). "Stress Analysis of Fiber-Reinforced Composite Materials," The McGraw-Hill Companies, Inc.
7. Lewark, Blaise A., "Reinforced baseball bat," 2000, U.S. Pat. No. 6,036,610.
8. Mellor, J. F. (1997). "Development and Evaluation of Continuous Zig-zag Composite Damping Material in Constrained Layer Damping," *Masters Thesis*, Provo, Utah, Brigham Young University.
9. Olcott, D. D., (1992). "Improved Damping in Composite Structures Through Stress Coupling, Co-Cured Damping Layers, and Segmented Stiffness Layers," *Ph.D. Thesis*, Provo, Utah, Brigham Young University.
10. Pratt, W. F. (1998). "Damped Composite Applications and Structures Using Wavy Composite Patterns," Patent Application 60/027,975. US & PCT.
11. Pratt, W. F. (1999). "Patterned Fiber Composites, Process, Characterization, and Damping Performance," *Ph.D. Dissertation*. Provo, Utah, Brigham Young University, 195 pgs. (Note: not publicly released as of 1 Dec. 2000).
12. Pratt, W. F. (2000). "Method of making damped composite structures with fiber wave patterns," U.S. Pat. No. 6,048,426. US & PCT, Brigham Young University.
13. Pratt, W. F. (2000). "Crossply Wavy Composite Structures," Provisional Patent Application 60/240,645. US & PCT.
14. Pratt, William. F; Allen, Matthew; Jensen, C. Greg, "Designing with Wavy Composites," SAMPE Technical conference, 2001, Vol. 45, Book 1, pp 302-215.
15. Pratt, William. F; Allen, Matthew; Skousen, Troy S., "Highly Damped Lightweight Wavy Composites," Air Force Technical Report AFRL-VS-TR-2001-tbd, 2001.
16. Reinfelder, W., C. Jones, et al. (1998). "Fiber reinforced composite spar for a rotary wing aircraft and method of manufacture thereof", U.S. Pat. No. 5,755,558. US, Sikorsky Aircraft Corporation.
17. Sample, Joe M., "Break resistant ball bat," 20001, U.S. Pat. No. 6,238,309.
18. Trego, A. (1997). "Modeling of Stress Coupled Passively Damped Composite Structures in Axial and Flexural Vibration," Brigham Young University, *Ph.D. Thesis*, Provo, Utah, Brigham Young University.

Hyer (Reference 6) is a good all-around and current basic composite book that covers the properties of composites, especially unidirectional pre-preg based crossply laminates. Wavy composite is not mentioned at all.

Mellor (Reference 8) proposed the use of standard bi-directional cloth in a zig-zag (chevron) pattern contemplated by both Dolgin and Olcott as a constraining layer for viscoelastic materials. Mellor did not contemplate use of wavy or chevron patterned laminae used in conjunction with crossplies of unidirectional material that are substantially perpendicular to the general lay of the wavy or chevron patterned laminae. Nor did he discuss the use of woven fiber mats with wavy patterns in the warp, and/or such woven cloths with varying percentages of fill fibers.

Olcott (Reference 9) predated Mellor and proposed, fabricated, and tested the chevron patterns used as constraining layers for viscoelastic damping layers contemplated by Dolgin. Olcott did not contemplate use of wavy or chevron patterned laminae used in conjunction with crossplies of unidirectional material that are substantially perpendicular to the general lay of the wavy or chevron patterned laminae. Nor did he discuss the use of woven fiber mats with wavy patterns in the warp, and/or such woven cloths with varying percentages of fill fibers.

Reinfelder, et al, (Reference 16) discussed the construction of a rotary wing spar for use on a helicopter. It is a good example of the superiority of crossply laminates and is an example of an application that could benefit from the use of wavy crossply laminate structures.

Trego (Reference 18) extended the Finite Element Analysis model proposed by Olcott (Reference 9) and built several chevron based constrained layer damping tubes to validate the model. No mention was made of using wavy composites in wavy crossply lay-ups nor wavy or chevron patterned laminae used in conjunction with crossplies of unidirectional material that are substantially perpendicular to the general lay of the wavy or chevron patterned laminae. Nor did she discuss the use of woven fiber mats with wavy patterns in the warp, and/or such woven cloths with varying percentages of fill fibers.

Crossply lay-ups, as discussed by Reinfelder, et al, and Hyer, typically involve the use of unidirectional pre-preg with fiber orientations designed to maximize the desired structural properties. For example, if a tube is to be loaded in the longitudinal or axial mode, most if not all of the unidirectional fibers would be oriented in the longitudinal (or 0°) direction for maximum stiffness. Some small percentage of total fibers in the tube may be oriented perpendicular to these fibers for hoop strength, to prevent separation, or to prevent buckling, but such fibers would not resist longitudinal loads. Such tubes are easy to make by cutting an appropriate length of unidirectional pre-preg from a roll and rolling the composite onto a mandrel. No fibers (for the 0° layers) are cut or interrupted. Loads are resisted best when fibers are not cut. If cut, loads between such fibers are transmitted through the matrix or resin and stiffness and strength can be considerably reduced. A tube with all or mostly 0° fibers would be very efficient in resisting longitudinal loads but would not resist any significant torque or bending loads because such loads would be resisted primarily by the shear strength of the matrix and not by fibers.

A better design for resisting torque loads in a tube would be to add additional layers of fibers oriented at angles to the longitudinal axis so that the fibers would spiral around the tube. Such fibers would provide the primary resistance to torque loads and would provide resistance to shearing loads along the neutral axis during bending similar to a truss like structure. To avoid cutting the fibers (except at the ends of a tube) the unidirectional pre-preg would have to be spirally wound on the tube which is a concept that sounds simple, but in reality is extremely difficult to do correctly. More typically, the unidirectional materials are cut at an angle from a larger sheet and the "off-axis" rectangle of material thus created is rolled On to the tube as is done for the longitudinal fiber plies. This leaves a series of cut fibers that spiral around the tube ending on a discernable seam that runs the length of the tube. This represents a potentially significant weakness in the crossply laminate. If several such layers of opposing "off-axis" plies are used, the normal practice is to offset the ending and beginning of such plies so that the seams of each layer are offset. (Reinfelder, et al, 1998).

Pratt (Reference 10) proposed the use of wavy composite contemplated by Dolgin (references 3 and 4) as constraining layers for a soft viscoelastic damping material in several combinations of wavy composite, viscoelastic, and conventional materials. Additionally, Pratt proposed the use of "wavy pre-preg for use with or without a separate viscoelastic layer" but did not teach or further amplify the construction or benefits. Pratt (Reference 11, page 92) proposed, constructed, and tested balanced wavy composite crossply samples (without viscoelastic layers) for the purpose of determining the properties of wavy composite. Pratt (Reference 10) revealed and taught the advantages of using wavy crossply composite laminates in structures to provide improved structural properties, especially resistance to torque, bending, and axial loads.

Dolgin (Reference 3) proposed a specialty composite structure made from opposing chevron and sinusoidal patterned composite lamina constraining a viscoelastic layer. In Reference 4 Dolgin stated that the production of wavy sinusoidal pre-preg should be possible but did not describe any process or apparatus. Neither reference taught or cited any method of constructing or using wavy or chevron patterned composites as replacements for unidirectional pre-preg based wavy crossply laminates, nor the use of combinations of wavy crossply laminates in conjunction with Dolgin's (references 3 and 4) wavy damping methods.

Cabales, et. al. in references 1 and 2 propose the construction of golf club shafts using concepts invented by Dolgin (Reference 3) and techniques proposed by Olcott (Reference 9). The basic design contemplated by Cabales, et. al. relied on two load bearing laminates on the inside and outside of the shaft, placing a "damping device" in the space between these laminates using viscoelastic and "V" or "herringbone" fiber patterns proposed by Olcott (Reference 9). These V or herringbone patterns are constructed from strips of unidirectional material that is cut on an angle and then joined by a series of overlapping butt joints (Reference 9). Such methods are impractical in the extreme requiring an estimated 70 separate pieces of composite for one "damping device" that must be hand assembled for one shaft. Additionally, because of the inherent weakness of the overlapped butt joints, a minimum of four layers must be used for any V or herringbone damping layer (Reference 9). Such a shaft, if it can be accurately assembled at all, would weigh at least 50% more than a steel golf shaft and would therefore be unacceptable to the public. In short, such a design is impractical if not impossible.

Finally, Cabales, et. al. did not contemplate the use of wavy or sinuous fiber reinforced materials either in their claims or the disclosure of the invention but instead specifically cited Olcott's "V" or herringbone method in the claims. Additionally, Cabales, et. al. state that the use of precisely controlled regions or lengths of viscoelastic material application are required for the efficient damping of higher vibration modes of the shaft. More recent research in references 14 and 15 show that peak damping frequency and damping magnitude at any given frequency are only functions of the wave period and will dampen all modes based on the characteristics of the material.

Since Olcott did not use methods of testing that produce an accurate characterization or material nomograph of the "V", herringbone, or "zig-zag" laminate design, such an understanding of the material's true properties was never accomplished and Olcott and others were left to erroneously conclude that damping performance was a function of the length of the damping regions and not a function of the period and maximum angle of the pattern.

Finally, Cabales et. al. indicate that the "V" or "herringbone", or "zig-zag" patterns in the layers (items 10 & 12 in FIGS. 1-3, and items 310 & 312 in FIGS. 4-5) are joined along their length to the structural layers of the shaft (items 16 & 18 FIGS. 1-5) which defeats the differential shearing action necessary for damping. This means that these layers would be essentially non-functional and would contribute little if anything to the damping performance of the shaft. As shown by Pratt, et. al. in references 10, 14, and 15 wavy damping layers must be free to shear differentially to be effective. The same is true for the "V" or "herringbone", or "zig-zag" patterns contemplated by Cabales, et. al.

In Reference 10, Pratt revealed an enhanced method of making composite structures with crossply characteristics but constructed entirely from wavy composite. Pratt showed how wavy composite pre-preg can be used to create virtually seamless crossply-like laminates with little or no interruption of fibers. Such a laminate displays the properties of both unidirectional and crossply characteristics in that it can efficiently resist both axial and transverse shearing loads.

Application of Dolgin's sinuous or wavy composite damping concept shown in FIG. 1 on a base structure made either with conventional composite materials (unidirectional, woven cloth), isotropic materials (steel, aluminum, etc.), or wavy crossply materials (FIG. 15, Item 7), provides for an efficient, lightweight, and highly damped golf club (FIG. 22) as one example. Such a golf shaft requires only 10 separate pieces of material including two viscoelastic layers, can be assembled in a few minutes and is capable of automated assembly, and is at least 25% lighter than a typical steel shaft of the same stiffness. Therefore there remains a need for a practical method of making golf club shafts (and other devices) using Dolgin's sinuous or wavy composite damping concept that has heretofore not been contemplated by others.

Easton, et. al. in Reference 5 describes an internally reinforced metal ball bat wherein the internal reinforcing material is comprised of bi-directional composite cloth layers applied to the interior of the barrel. The advantages cited were reinforcement, added strength and quicker shape recovery after impact. Lewark in Reference 7 reinforced a wooden bat in the handle region with bi-directional composite cloth layers to provide for breakage resistance. Sample in Reference 17 provided reinforcement to the handle of a wooden bat with straight fibers oriented along the length of the handle. None of these references mention wavy composite nor a method for reinforcing the handle of a bat with crossply wavy composite nor adding damping to the body of the bat using wavy composite damping layers. This is true for wooden bats, hollow metal bats, composite bats, or hybrid designs combining wood, and/or metal, and/or composite.

The composite structures of this invention may take a variety of forms, including plates with or without stiffeners, beams, curved surfaces, or irregular shapes. In any event, each structure has at least one wavy composite laminate and at least one viscoelastic layer. The viscoelastic layer need not be a separate material or layer but may be formed by a thin boundary layer of matrix from the composite during curing; such a wavy composite material would of course have a special matrix. This invention also includes the use of wavy laminates that have some substantially straight fibers arrayed generally perpendicular to the sinuous path of the wavy fibers for improved torsional, in-plane shear, and out-of-plane twisting resistance.

DISCLOSURE OF INVENTION

The terminology wavy composite will be used to define any fiber-matrix combination having at least one fiber without a break (or interruptions and having a pattern which can be defined by a mathematical algorithm. Typically, such curves have $G^1$ geometric continuity. A fourier series expansion is a mathematical algorithm which can, in general, be used to define nearly any desired shape such as a pseudo random, sinusoidal, periodic or mixed wave shape.

The lay of fiber in a wavy composite layer is varied continuously in a periodic wavelike form. A simple sinusoid wave form may be used, however, other wave forms which may or may not be periodic may also be used. It is also envisioned to employ an optimal waveform for damping particular vibration frequencies at particular locations of a structure. In general, the term sinuous will be used to describe a generalized wavy composite.

The invention also includes fiber patterns which change their wavelength and/or waveform along the loading direction. The inventor has discovered that for a given frequency and temperature many viscoelastic adhesives will require an optimal wavelength to maximize damping in the structure. While a structure with a constant wavelength can be optimized for a given frequency and/or temperature, placement of a changing wavelength or waveform can optimize a structure for a broader range of frequencies and/or temperatures.

A CWCV is defined by specifying the angle of the fiber lay along the composite layers (e.g. the orientation angles of the fiber with respect to the loading direction), the thickness of the composite layers, and the number of composite and viscoelastic layers in the structure.

The terminology CWCV (continuous wave composite viscoelastic) will be used to define a composite structure which uses at least one layer of wavy composite material having viscoelastic properties (or 'anisotropic viscoelastic'); or at least one layer of wavy composite material combined with at least one layer of viscoelastic material either in a sandwich construction or adjacent construction.

The ends of a CWCV structure according to the present invention may be restrained without significantly reducing the overall damping properties of the structure. There results a structural element possessing high axial stiffness and low weight. The structural elements of this invention offer markedly superior damping capabilities but are nevertheless useable with simple attachment fixtures and methods.

Damping is induced in the structure primarily by the differential shearing of the viscoelastic layer by the wavy composite laminate. This shearing induces elongation of the long chain polymers in the viscoelastic which in turn generates heat, causing energy loss in the structure. This energy loss accounts for the primary source of damping in the structure.

The present invention is directed to the use of wavy composite and damping materials in basic structural components typically representing parts of panels, plates, and beams.

The composite structures of this invention may take a variety of forms, including tubes, plates, beams or other regular or irregular shapes. In any event, a typical structure will at a minimum include a first stiffness layer or matrix, a damping material, and a second stiffness layer or matrix. Each stiffness layer or matrix will include at least one reinforcing fiber and will be at least several thousandths of an inch thick. Layers with multiple plies and of much greater thickness; e.g. several inches, are envisioned. The fibers of a multi-ply layer may be of similar or dissimilar orientation. The damping material may be of any appropriate thickness, depending upon the application involved, as well as the properties of the damping material selected. The damping material may comprise another layer interposed between the stiffness layers, or may be incorporated into the stiffness layer. Typically, the damping material will be as thin as is practical, to avoid adding excess weight to the structure. It is not unusual, however for a layer of damping material to exceed in thickness the total thickness of the stiffness layers. The stiffness layers may be constructed of any of the reinforcing fibers and matrix materials which would otherwise be appropriate for a particular application. The damping material will ordinarily be selected to provide optimum damping loss at the temperatures and vibrational frequencies expected to be encountered by the composite structure.

The present invention is directed to an improved composite structure and method for manufacturing the same from wavy fiber pre-preg materials. Generally, characteristics of the structure and methods include:

Two or more wavy laminae used in opposing patterns or offset patterns in a composite structure, where the laminate properties created have variable crossply characteristic.

Laminate properties that can be tailored by the stacking sequence, waveform, offset, axis orientation, and material used.

Wavy crossply structures that can be laid down by tape laying machines and apparatus with as little as one axis of control.

Wavy crossply structures that minimize the interruption of fibers thereby making the laminate stronger and less prone to failure.

Wavy composite pre-preg can be used to create virtually seamless crossply-like laminates with little or no interruption of fibers. This is simply accomplished by combining two or more wavy composite plies using opposing waveforms in its simplest form, or by using combinations of opposing and offset wavy composite waveforms to form the laminate. Such a laminate displays the properties of both unidirectional and crossply characteristics in that it can efficiently resist both axial and transverse shearing loads.

The fact that such a structure, which has fibers oriented in multiple directions, can be laid down with standard automation equipment (with as little as one axis of control) makes the structure and method economical. This is in contrast to laminates and methods used to make conventional unidirectional pre-preg based crossply laminates which cannot readily be automated. Additionally, experience has shown that wavy pre-preg can be more easily draped over contoured surfaces and tooling, further easing fabrication.

Finally, there is a finite maximum width to pre-preg (typically 60 inches maximum) which often causes laminators to have to splice and overlap sheets of unidirectional pre-preg together to form large laminae. This is especially true for off-axis unidirectional laminae. This introduces seams which often represent a significant weakness in the laminate (see FIG. 17, items 12-14). Wavy composite can be easily spliced together across the width without the need to interrupt the edge fibers (see FIG. 17, item 1 and 15). Since the present invention discloses how wavy composite laminae can be combined to produce crossply laminate structures, it is now possible to create such structures with a minimum of interruption of fiber continuity and without overlapping seams. In fact, wavy crossply tubes have been made that exhibit no discernable seam, have no interruption of fibers (except naturally at the ends of the tubes), and which display classic crossply laminate characteristics.

The present invention also relates to the use of wavy composite and unidirectional composite in crossply lay-ups in the generalized fabrication of tubes, wing spars, rotary wing spars, and similar structures.

The present invention also relates to the use of wavy composite and unidirectional composite in crossply lay-ups as shown in FIG. 20 in the fabrication of tubes, golf club shafts, torque tubes, drive shafts, fishing rods, baseball bats, containment for concrete or reinforced concrete columns and beams, and similar structures.

The present invention also relates to the use of wavy composite and unidirectional composite in crossply lay-ups using interrupted viscoelastic methods as shown in FIG. 21 in the fabrication of tubes, golf club shafts, torque tubes, drive shafts, fishing rods, baseball bats, containment for concrete or reinforced concrete columns and beams, and similar structures.

BRIEF DESCRIPTION OF DRAWINGS

The accompanying drawings (FIGS. 1-12), were incorporated in the original patent (reference 12) and constitute a part of the specifications and preferred embodiment for that invention. They are presented here as reference and further explanation for FIGS. 13-22.

The accompanying drawings (FIGS. 3-11), which are incorporated in and constitute a part of the specification, illustrate preferred embodiments of the invention, and serve to explain the principles of the invention.

Figure 1:
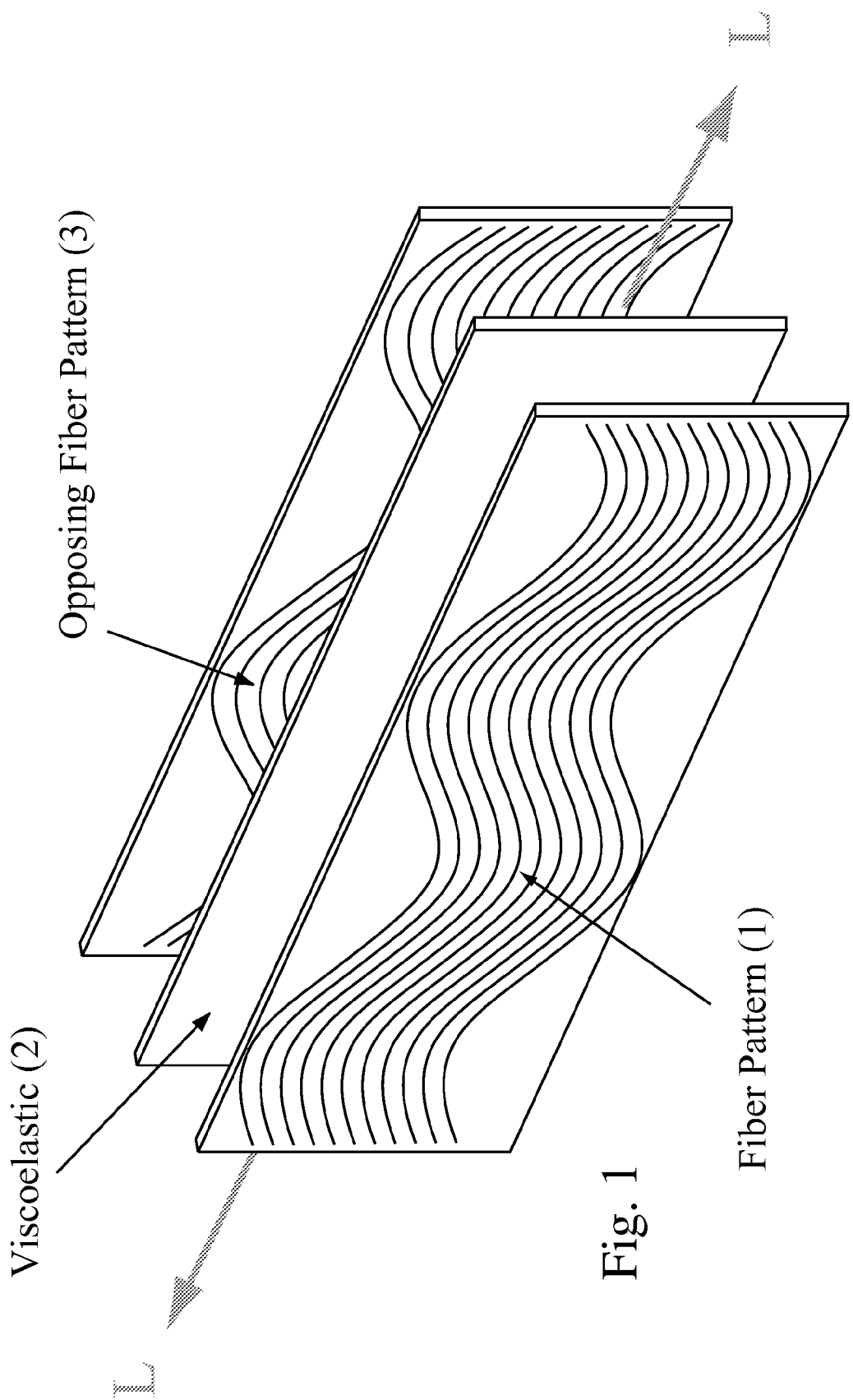
FIG. 1 is an exploded perspective view of a composite material according to a generalized embodiment of the present invention. It is an exploded perspective view of the Dolgin invention, Reference 3.

FIG. 3 shows a perspective view and series of end views of a CWCV plate, according to an alternate embodiment of the present invention. It is the most basic CWCV laminate building block consisting of opposing waves constraining a viscoelastic layer as shown in FIG. 1.

FIG. 4 shows a perspective view and a series of end views of CWCV plates with damped CWCV hat-stiffeners, according to an alternate embodiment of the present invention.

FIG. 5 shows a perspective view and a series of end views of CWCV structures with damped CWCV laminates and I-beam, C-channel, Z-channel stiffeners, according to an alternate embodiment of the present invention.

FIG. 6 shows a perspective view and a series of end views of CWCV structures with damped CWCV laminates and core materials used to give the structure shape, according to an alternate embodiment of the present invention.

FIG. 7 shows end views of aerodynamically shaped CWCV structures with damped CWCV laminates and CWCV hat-stiffeners, and/or I beam and/or channel stiffeners, according to an alternative embodiment of the present invention.

FIG. 8 shows a perspective view of a CWCV plate and a series of end views of damped CWCV laminates and CWCV structures with CWCV hat-stiffeners or I-beam stiffeners, according to an alternative embodiment of the present invention.

FIG. 9 shows a perspective view and end views of damped CWCV materials used to build a snow ski, water ski, snow board, etc. with damped CWCV laminates on one side, and common core materials, metal edgings, and surface materials, to enhance damping and dynamic properties, according to an alternative embodiment of the present invention.

FIG. 10 shows a perspective view and end views of damped CWCV materials used to build a snow ski, water ski, snow board, etc. with damped CWCV laminates sandwiching a common core material, in addition to metal edgings and surface materials, to enhance damping and dynamic properties, according to an alternative embodiment of the present invention.

FIG. 11 shows a perspective view and end views of damped CWCV materials used to build a snow ski, water ski, snow board, etc. with damped CWCV laminates wrapped around a common core material, in addition to metal edgings and surface materials, to enhance damping and dynamic properties, according to an alternative embodiment of the present invention.

FIG. 12 shows a perspective view and a series of cutaway views of CWCV tubular components with damped CWCV laminates, according to a generalized embodiment of the present invention.

Figure 13:
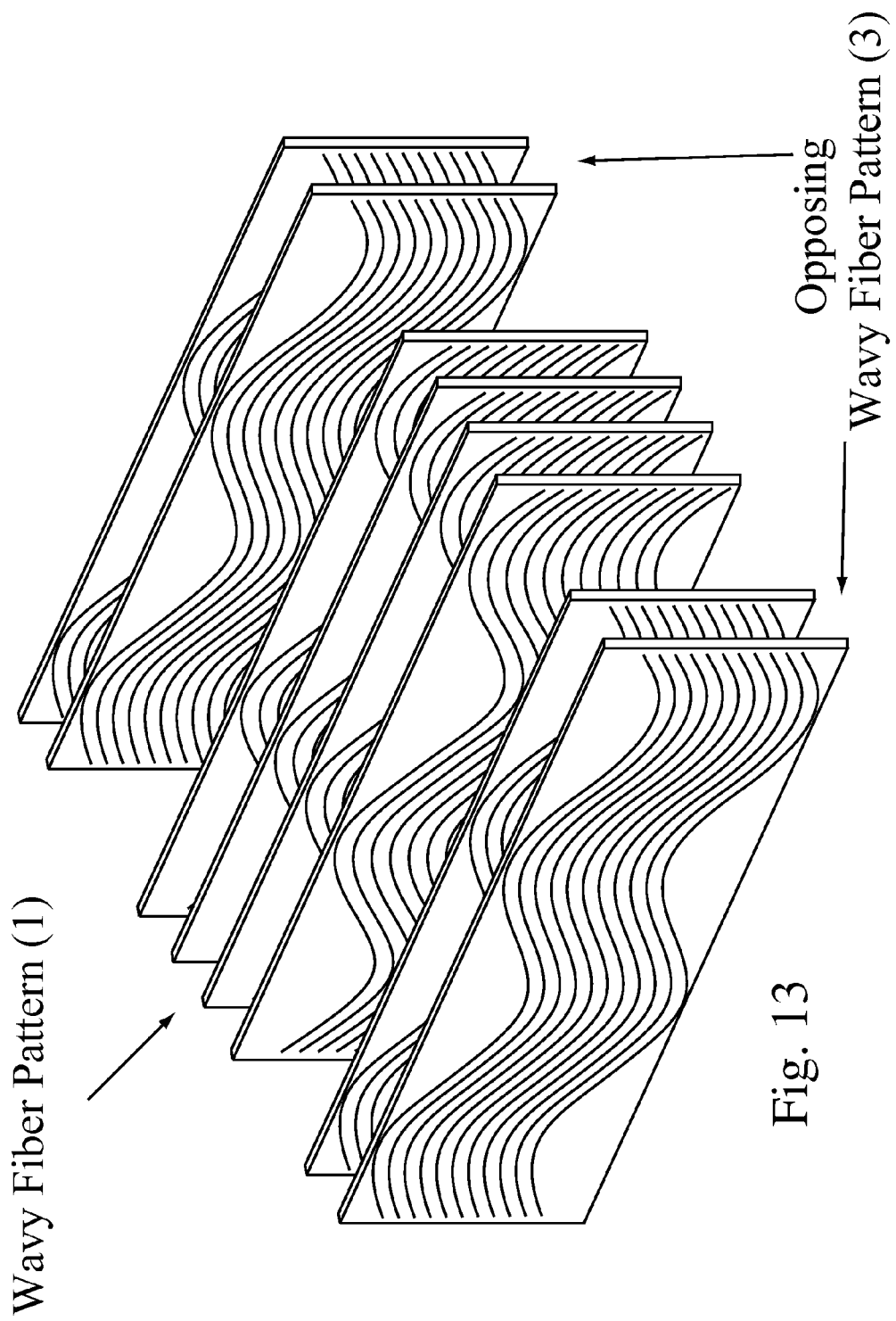

FIG. 13 is an exploded perspective view of a balanced wavy crossply lay-up used to perform stiffness and strength tests on wavy composite material according to Reference 11.

Figure 14:
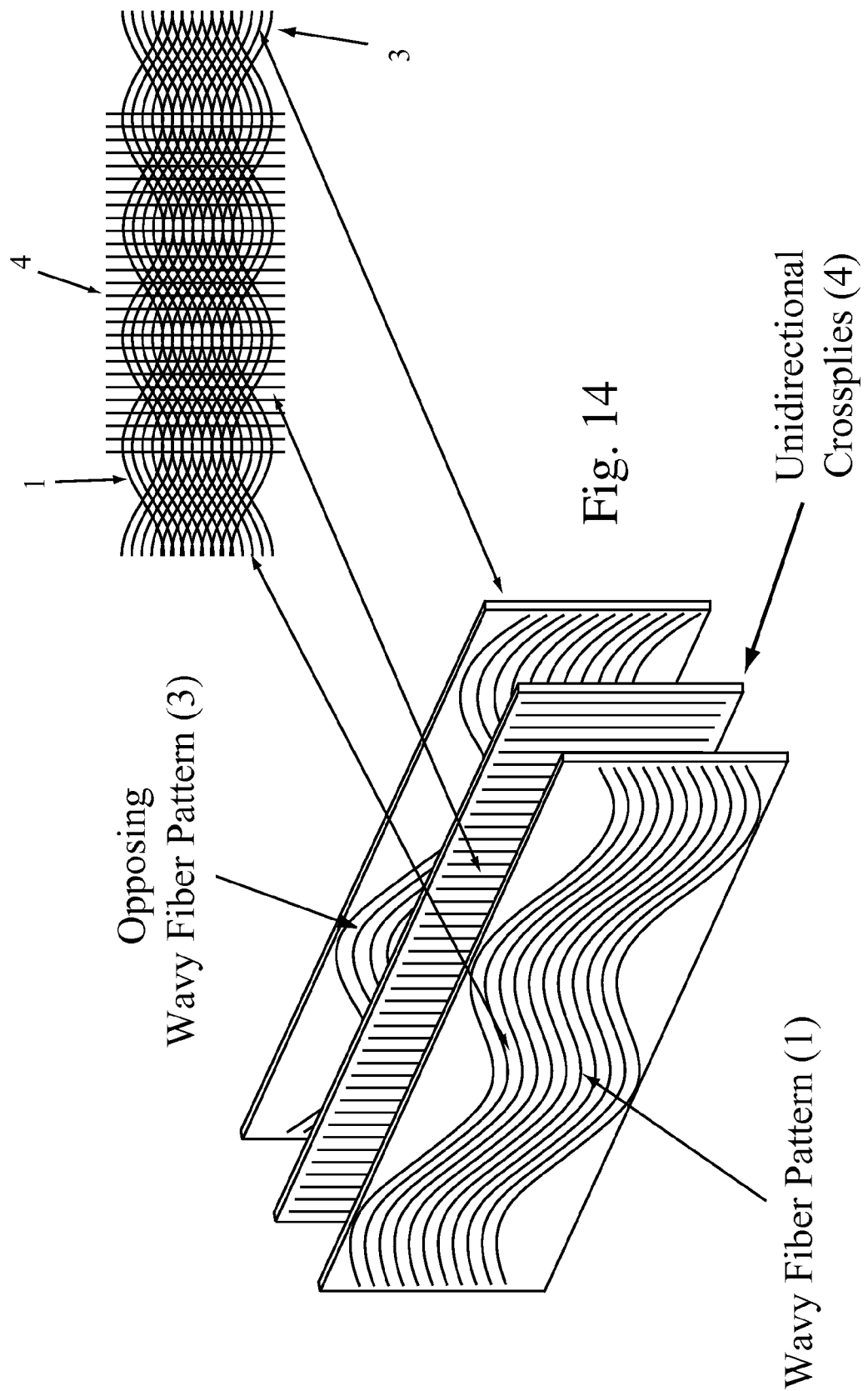

FIG. 14 is an exploded perspective and corresponding side view of a wavy crossply lay-up with a unidirectional ply interposed for the purpose of improving laminate properties according to a generalized embodiment of the present invention.

Figure 15:
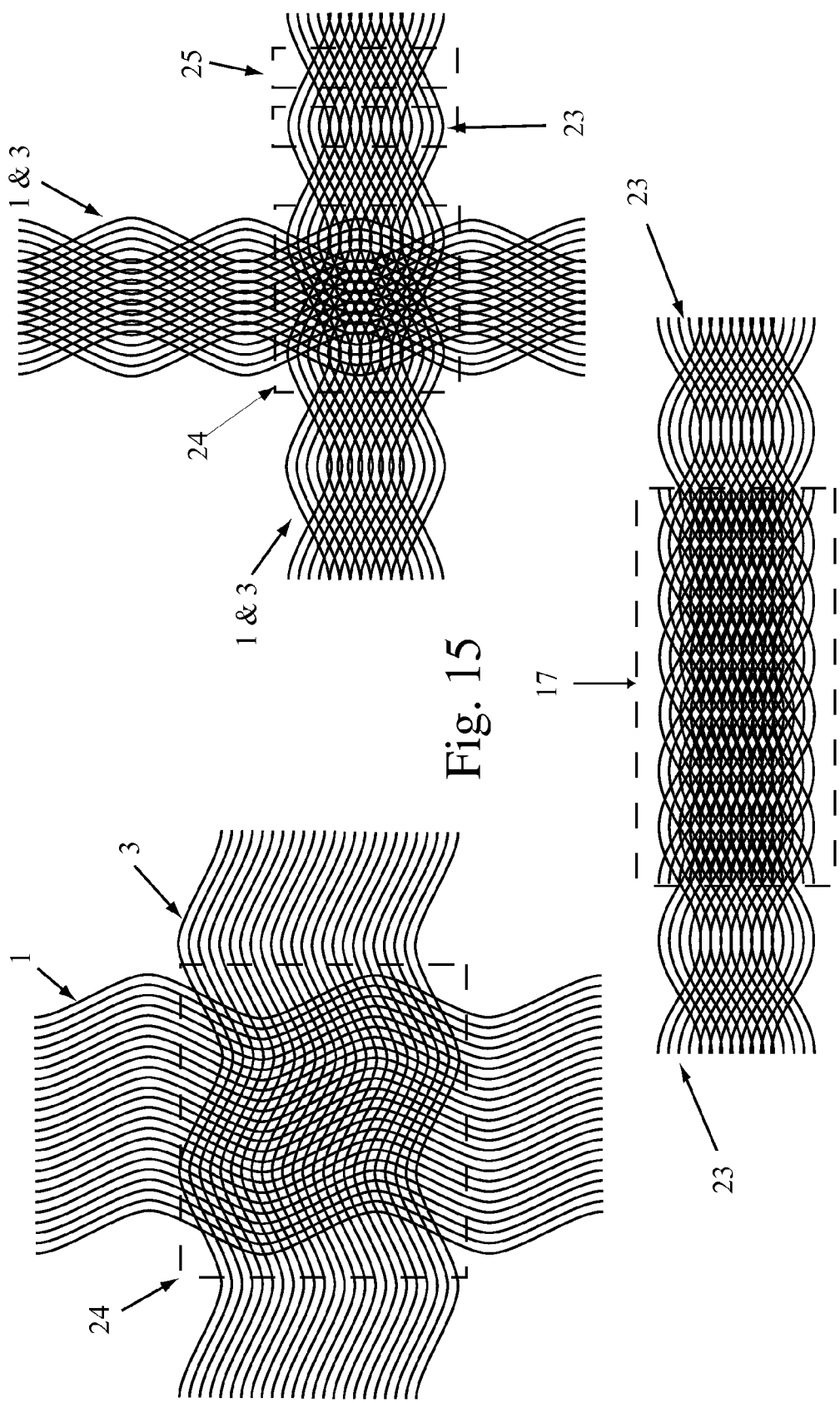

FIG. 15 is a top-down side view of different wavy crossply lay-ups for the purpose of improving laminate properties according to a generalized embodiment of the present invention.

Figure 16:
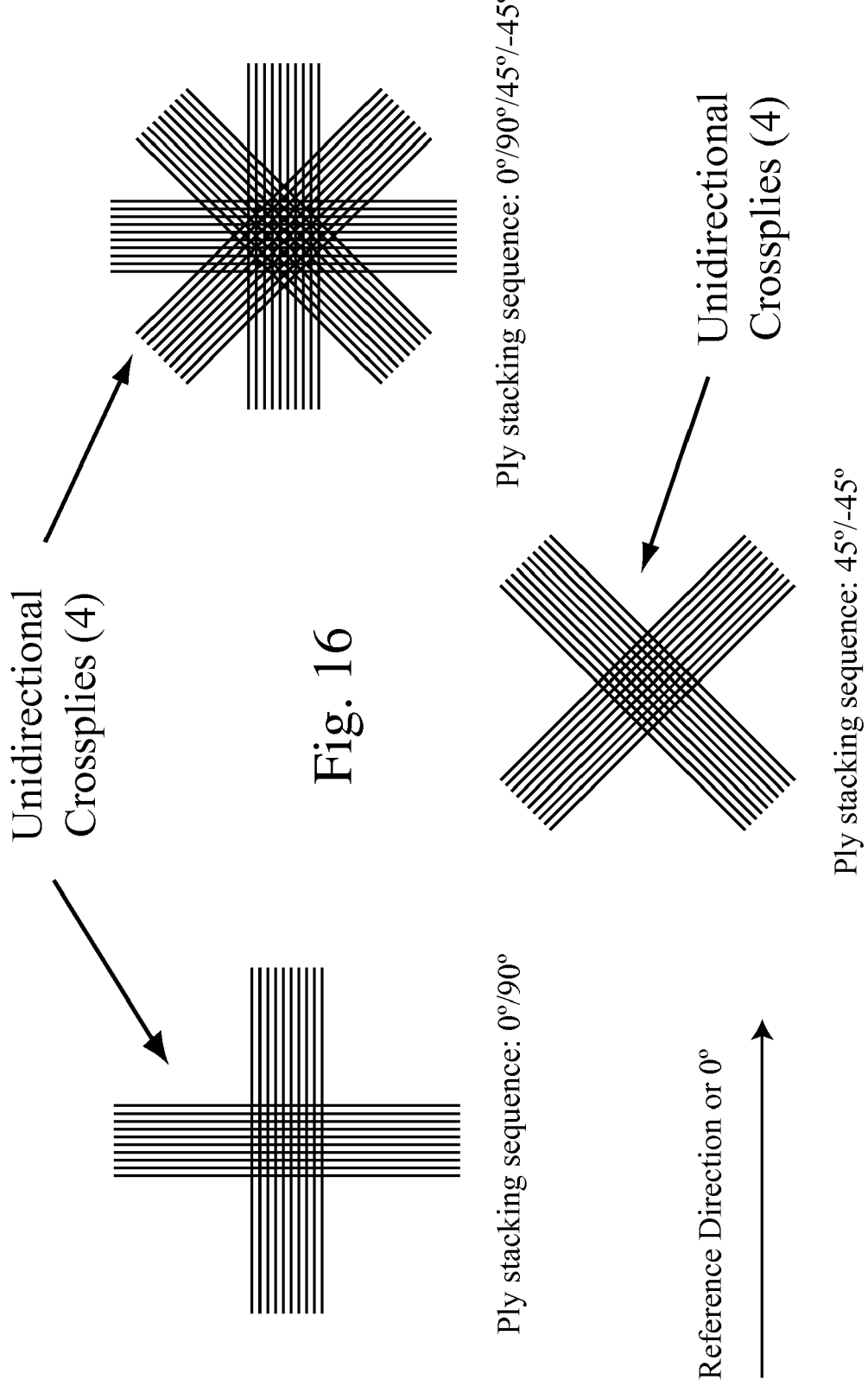

FIG. 16 is a top-down side view of different unidirectional crossply lay-ups for the purpose of comparison to the present invention.

Figure 17:
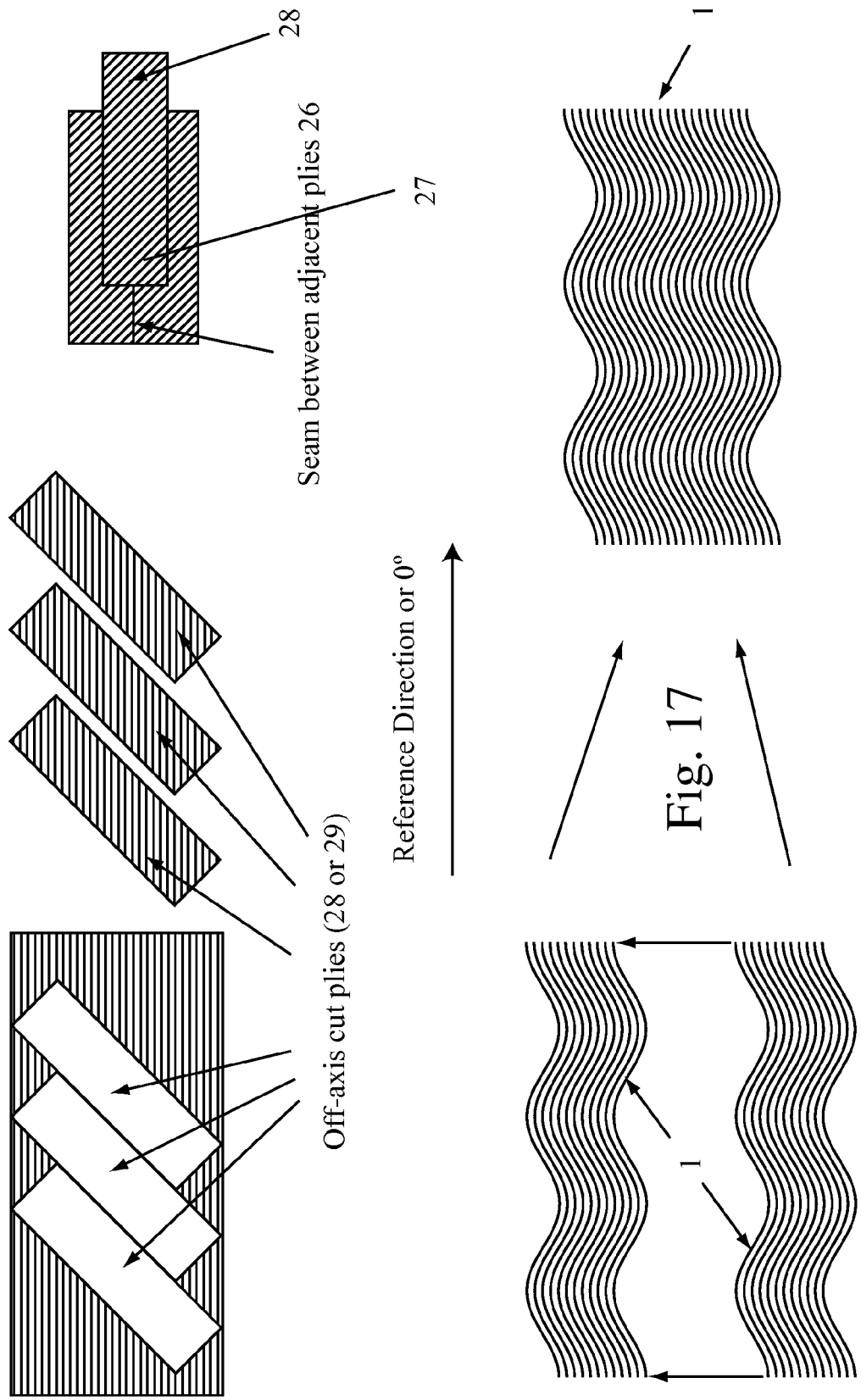

FIG. 17 is an illustration of the advantages of joining adjacent wavy composite plies to make wider laminae compared to typical methods used to join adjacent off-axis unidirectional materials to create wider laminae.

FIG. 18 illustrates the ease with which wavy composites can be used to construct efficient crossply-like layups compared to unidirectional ply methods.

Figure 19:
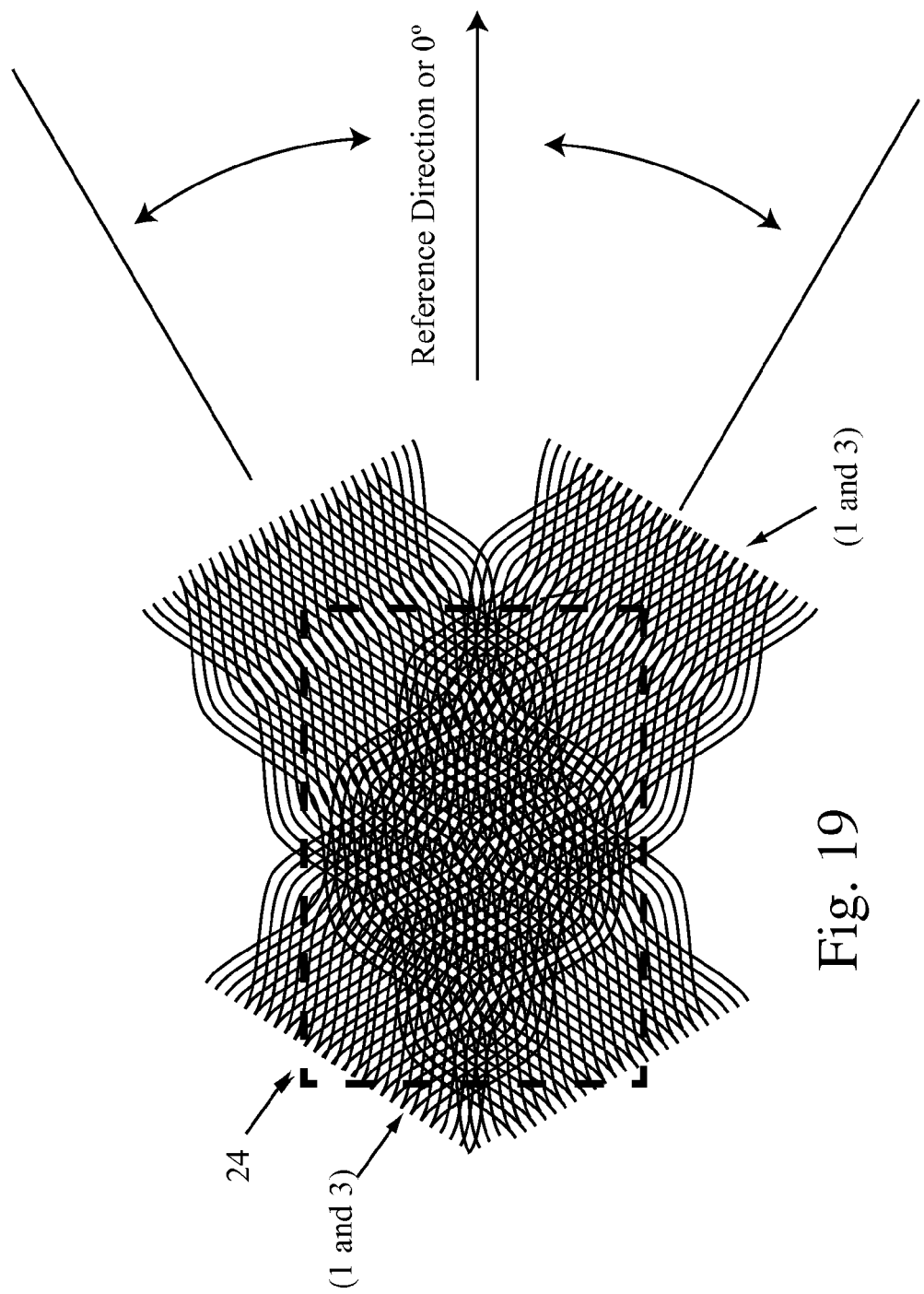

FIG. 19 is an example of a using wavy composite offset by an angle with respect to a reference axis, with improved laminate properties according to a generalized embodiment of the present invention.

Figure 20:
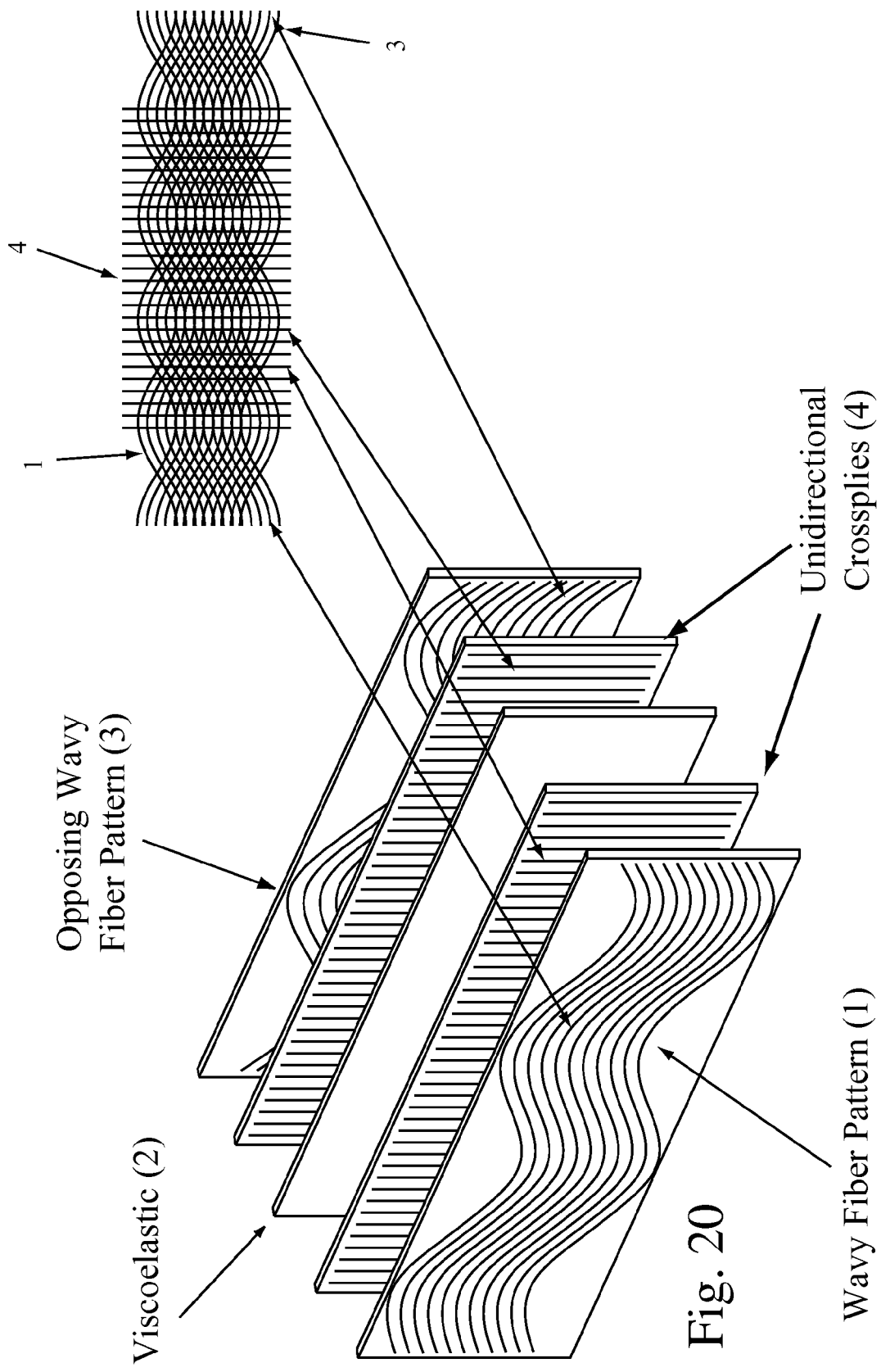

FIG. 20 is an exploded perspective view of one concept of the present invention which uses the basic structure of the Dolgin concept (Reference 3), augmented by the addition of unidirectional plies to the wavy constraining layers for the purpose of increasing stiffness, according to a generalized embodiment of the present invention.

FIG. 21 is a perspective view of one concept of the present invention which uses the basic structure of the Dolgin concept (Reference 3), augmented by the addition of unidirectional plies to the wavy constraining layers for the purpose of increasing strength, were the constrained viscoelastic layer is discontinuous for the purpose of increasing strength, according to a generalized embodiment of the present invention. The concept of using unidirectional fibers that are substantially perpendicular to the generalized lay of the sinuous fibers applies to woven cloths where the warp fibers are wavy and the fill fibers are substantially straight.

FIG. 22 shows the construction of a typical golf club shaft with damping layers and wavy composite used to provide superior properties, according to a generalized embodiment of the present invention. The concept of using unidirectional fibers that are substantially perpendicular to the generalized lay of the sinuous fibers applies to woven cloths where the warp fibers are wavy and the fill fibers are substantially straight.

BEST MODE FOR CARRYING OUT THE INVENTION

Figure 2:
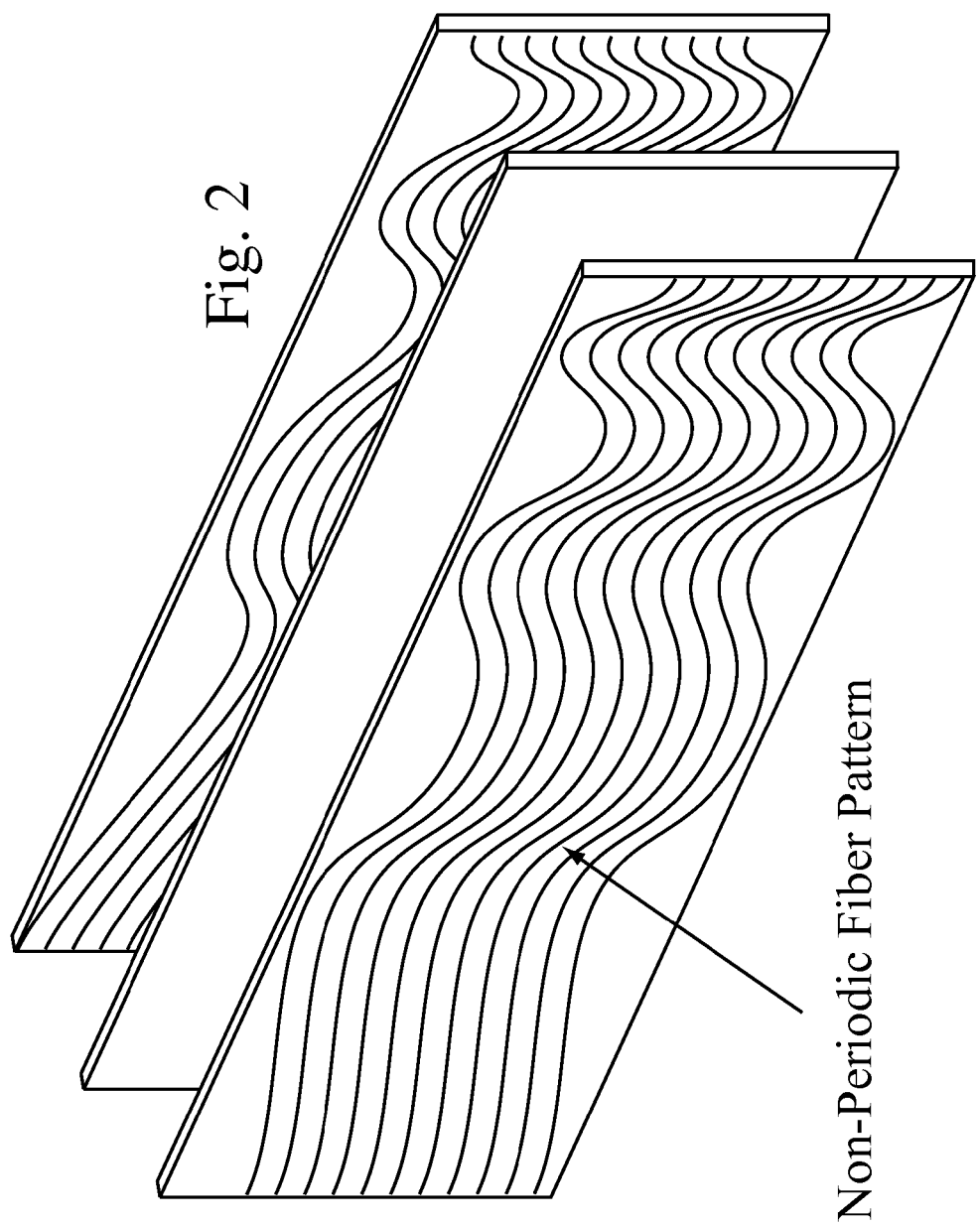
FIG. 2 is an exploded perspective view of a composite material according to an alternate embodiment of the present invention.

The most basic wavy composite structure is shown in FIG. 1 where a wavy composite layer (1) is combined with a viscoelastic layer (2) and an opposing wavy composite layer (3) with generally the same waveform as the first layer (1) but with a waveform that is offset by half a wavelength. The waveform need not be sinusoidal but may be any waveform that accomplishes the desired stiffness and damping performance. For example the waveform may vary along the length as shown in FIG. 2. In general, the waveform shown in FIG. 1 (1) and FIG. 2 would be described as sinuous. The wavy composite layers (1 & 3) may be made with bi-directional cloth as well as unidirectional fibers.

The CWCV shown in FIGS. 3-12 show a fiber pattern that is generally sinusoidal with a constant waveform, period, etc. Since the damping properties are frequency and temperature dependent, and since the selection of an optimal wave shape can be influenced by the desired structural response, a non-periodic, non-sinusoidal wave shape may be the preferred optimal wavy composite. There are other variables such as selection of materials, relative thickness of laminates, etc., not shown or discussed below that are important for correct design in addition to selection of wave shape, etc. The selection of these details will be necessarily customized for different designs and will be obvious to one skilled in the art. The discussions below are intended to illuminate the general design of CWCV that will be common to most CWCV structures and that will result in optimal strength, damping and stiffness. Therefore, wave shapes, relative sizes and thickness of component laminates, etc., will require analysis by the designer based on the desired structural response. The representations of these design parameters in FIGS. 3 through 12 are exemplary only.

The CWCV plate is the most basic unit built with these new materials. It can be shaped and bent to make stiffener building blocks. CWCV plates, stiffeners and cores cab be combined in any combination to form intermediate structural members. The intermediate structural members can be combined with additional CWCV building blocks to form larger structures.

FIG. 3a is a plate (7) with two layers of wavy composite and an intermediate layer of viscoelastic and represents the basic structure shown in FIG. 1.

In FIG. 3a-1 two of the plates (7) shown in FIG. 3a are combined without a viscoelastic layer in between so that the wavy composite laminates which are bonded together without the benefit of a viscoelastic layer are of a matched waveform (3). The laminate representation is $(1)/(2)/(3)/_2(2)/(1)$ where the number in parenthesis represents the material type as discussed above, and the subscript denotes the number of laminates of the indicated type. It has been found that balancing a multi-laminate CWCV plate in this manner gives the most efficient damping and strength performance. Two or more plates as shown in FIG. 3a-1 can be combined to form thicker laminates as shown in FIG. 3a-2.

The CWCV plate shown in FIG. 3a has its primary damping properties along the direction of the fiber pattern. The transverse damping properties are not as pronounced. FIG. 3b is a way of combining two CWCV laminates oriented at different angles with respect to each other and bonded by a viscoelastic layer. This allows the engineer and designer to design structures with efficient damping properties in more than one direction. The example shown in FIG. 3b shows two CWCV plates (7) oriented at 90° with respect to each other. Items 1, 2, and 3 from FIG. 1 are combined with an additional viscoelastic layer (2) and another laminate (7) which is oriented in a different direction.

The laminate in FIG. 3b, provides efficient damping in more than one direction but represents an unbalanced ply laminate. The plate shown in FIG. 3c is a way of combining four CWCV plates with the top and bottom plates oriented in the same direction and the intermediate two plates oriented in another direction. Of course it is possible to combine multiple plates as shown in FIG. 3a, 3a-1 and 3a-2 in various directions to provide efficient damping and strength properties according to the design goals of the engineer.

FIG. 3d shows a wavy composite laminate (7) combined with viscoelastic materials (2) and conventional materials (8) which can be composed of traditional cross-ply laminates, isotropic materials, plastics, or other materials according to the design criteria of the engineer. In this case the conventional materials are shown constraining a central wavy composite laminate.

FIG. 3e shows the same basic structure of 3d but instead of a single wavy composite laminate (7), the conventional material (8) constrains an opposing CWCV plate (7) (such as shown in FIG. 3a). The designer is not limited to a single wavy composite laminate or a single CWCV plate but may combine any of the structures shown in 3a, 3a-1, 3a-2, 3b, and 3c to produce a CWCV plate with tailored properties of stiffness and damping in one or multiple directions.

FIGS. 3f and 3g show the same concepts as FIGS. 3d and 3e with one conventional material constraining layer (7) removed. The comments for 3d and 3e apply equally to these figures. It is therefore possible to produce a CWCV plate with tailored properties of stiffness and damping in one or multiple directions.

FIG. 3h shows a single conventional material (8) constrained on two sides by a CWCV plate. As shown in FIG. 3h the constraining wavy composite laminates (7) do not have to be opposing waveforms, but may if the designer chooses. FIG. 3i shows the same basic structure as FIG. 3h only with multiple CWCV plates.

In summary, it is possible for the designer to combine multiple layers of wavy composite laminates, viscoelastic materials, and conventional materials in any number of configurations according to the design criteria of the engineer. The examples of FIG. 3 are for illustrative purposes and other combinations will be obvious to one skilled in the art.

According to one aspect of the invention, a CWCV plate is bent to form any of the other building blocks all of which are termed "stiffeners". There are four basic shapes of a stiffener building block including the hat-stiffener, the I-beam, the C-channel, and the Z-channel. The terminology "hat-stiffener" will mean any channel shaped stiffener commonly used on lightweight structures. Generally they are "U" shaped in cross section but they can be any cross sectional shape such as semi-circle, "V" shaped, three sided square, etc.

The CWCV hat-stiffener is shown as Item 9 in FIG. 4 and is a basic building block for intermediate structural members and larger structures. For example, it can be used in combination with CWCV or conventional material plates to form a beam (for short widths) or part of a panel (for greater widths). The CWCV plate-hat-stiffener combination is an intermediate structural building block for several other larger structures such as panels, beams, curved surfaces, aerodynamic surfaces, rotor blades, propellers, skis, snow boards, any monocoque structure, and many practical structural members.

As shown in FIG. 4a (perspective view) a generalized hat-stiffened panel would consist of a hat-stiffener (9) shown with a (for example) sinusoidal waveform, a structural material (8) or a CWCV plate (7) (no wave form shown), and/or a second structural material (8) or a CWCV plate (7) (no wave form shown), or, a special surface treatment or material.

The composition of the hat-stiffener (FIG. 4a, Item 9) could include any one of the CWCV plates shown in FIG. 3. The plates of FIG. 4a (either a CWCV plate (7) and/or a conventional structural material (8)) could consist of one or more of the following: a) one or more opposing CWCV plates (7), and b) a conventional structural material (8) such as an isotropic metal, a conventional composite laminate, or any other suitable structural material.

FIGS. 4b through 4e show end views of only a few of the possible combinations of CWCV hat-stiffeners, conventional materials, CWCV plates, and viscoelastic materials (not shown to scale), and are meant to serve as examples for the structure shown in FIG. 4a.

In FIGS. 4b and 4e the hat-stiffener (9) consists of three laminates and two damping layers (shown shaded). In one embodiment all three laminates would consist of wavy composite laminates (1) & (3), and would constrain two viscoelastic or anisotropic viscoelastic damping layers (2). Two of the wavy composite laminates would be of one pattern (1)

on the inner and outer surfaces of the hat-stiffener, with an opposing wavy composite laminate (3) (a laminate having the same basic pattern of (1) but with a 180° phase shift), in the middle. (Figures are not drawn to scale.) An alternative embodiment would have the three laminates consist of one each of a wavy composite laminate, an opposing wavy composite laminate, and a conventional laminate or other material, constraining two viscoelastic or anisotropic viscoelastic damping layers (2). The three structural laminates are joined together at the "feet" for good bonding and structural purposes, the damping material being omitted in the region of the feet for this purpose. It is not necessary to configure the damping layers as shown (e.g. in an inverted "U" shape, on top and sides) but the damping layer may be on the top only, on the side only, or eliminated altogether, depending on the requirements of the designer. These examples were given using more than one viscoelastic layer and wavy composite laminate; of course it is possible to use any number of wavy composite laminates, viscoelastic layers, or conventional material layers, in any combination, to accomplish the design goals.

The term conventional structural material (8) as used in the following paragraphs means a composite laminate of unidirectional layers in some desired sequence, a woven laminate, or isotropic material.

The plate (either a CWCV plate (7) or a conventional structural material (8)) of FIG. 4a is shown in FIG. 4b and would represent the main load bearing member in the plate. As shown, the feet of the hat-stiffener are joined directly to the load bearing member promoting strength and good bonding. The laminates of FIG. 4b consists of two wavy laminates (1 and 3) and two damping layers (2). An alternative embodiment would have the two laminates (1) consist of a wavy composite laminate, and a conventional laminate or other material (8), constraining two viscoelastic or anisotropic viscoelastic damping layers (2). Only two laminates are shown in FIG. 4b but it is possible to have any number of alternating layers of opposing wavy composite laminates, viscoelastic or anisotropic viscoelastic damping layers, and conventional composites, according to the design criteria of the engineer.

It has been determined that the structure of FIG. 4c provides the most efficient and lightweight balanced hat-stiffened panel since it relies on the balanced laminate of FIG. 3b. Instead of a flexible plate as shown in FIG. 3b, the two CWCV plates are split, one becoming a hat-stiffener. It is possible to add an additional plate where the two plates split to form the hat-stiffener, so that the final cross section retains a uniform thickness and laminate structure as is shown in FIG. 4d. The designer is not limited to the use of only two plates. The "plate" construction may include any of the possible combinations discussed for FIG. 3, according to the design criteria of the engineer. Other combinations will be obvious to one skilled in the art.

FIG. 4 shows only a few of the design possibilities of the use of CWCV hat-stiffeners, CWCV plates, viscoelastic damping materials, mixed (if desired) with conventional composite or other materials. Other configurations will be obvious to one skilled in the art.

The CWCV I-beam stiffener is shown as Item 11 in FIG. 5 and is a basic building block for intermediate structural members and larger structures. For example, it can be used in combination with CWCV plate (7) or conventional material plates (8) to form a beam (for short widths) or part of a panel (for greater widths). The CWCV plate-I-beam stiffener combination is an intermediate structural building block for several other larger structures.

Figure 5F:
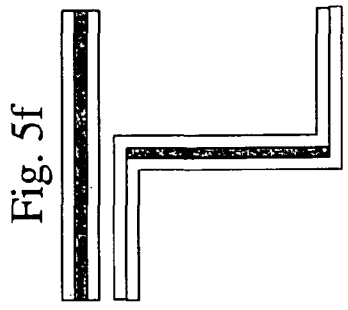
Figure 5E:
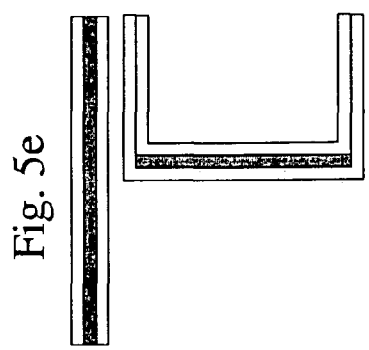
Figure 5A:
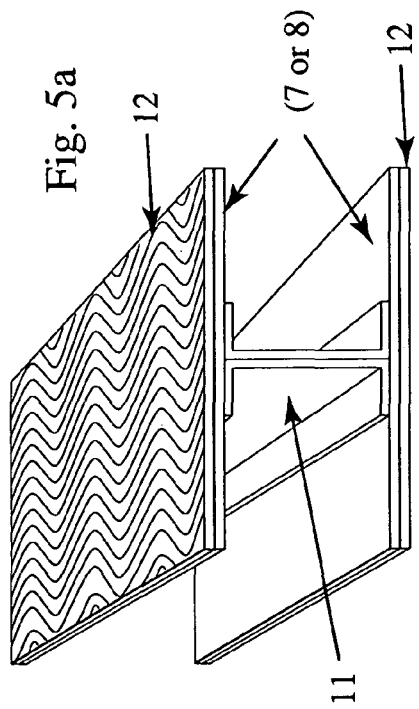

As shown in FIG. 5a (perspective view) a CWCV I-beam stiffener (11) would be combined with a structural laminate or a CWCV plate (7) shown with a (for example) wavy composite layer (1), a viscoelastic layer (2), a second opposing wavy composite layer (3), and a second structural laminate or a CWCV plate (7) (no wave form shown), or, a conventional structural material (8).

The I-beam stiffener (11) could consist of one or more of the following: a) a conventional composite laminate, conventional structural material such as an isotropic metal, or any other suitable material, and/or b) one or more opposing wavy composite laminates with one or more constrained damping layers of viscoelastic material.

The flanges (12) could consist of one or more of the following: a) one or more opposing wavy composite laminates constraining one or more damping layers of viscoelastic material, and/or b) a combination of wavy composite laminates, viscoelastic or anisotropic viscoelastic damping layers, and conventional composites or other suitable structural material.

FIGS. 5b through 5f show end views of only a few of the possible combinations of CWCV stiffeners, conventional materials, and CWCV.

Figure 5D:
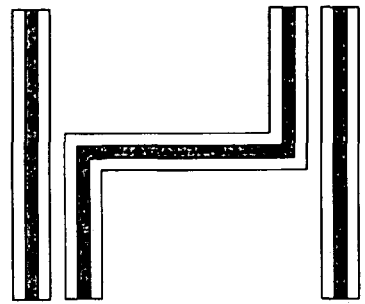
Figure 5C:
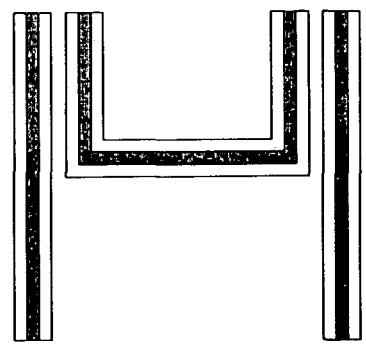
Figure 5B:
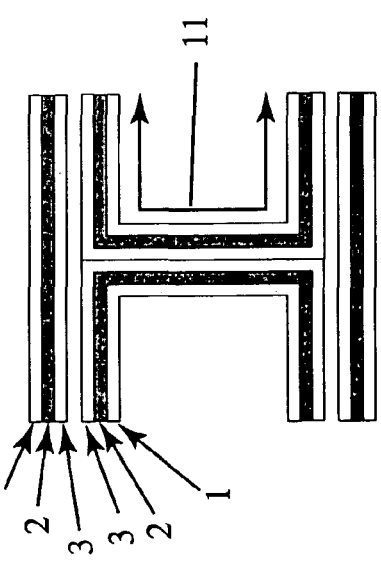

FIG. 5b shows one example of a CWCV I-beam stiffener combined with two CWCV plates (flanges). Any of the CWCV plates shown in FIG. 3 could be combined to form the basic I-beam shown in FIG. 5b.

FIG. 5c shows one example of a CWCV C-channel stiffener combined with two CWCV plates (flanges). Any of the CWCV plates shown in FIG. 3 could be combined to form the intermediate structure shown in FIG. 5c.

FIG. 5d shows one example of a CWCV Z-channel stiffener combined with two CWCV plates (flanges). Any of the CWCV plates shown in FIG. 3 could be combined to form the basic intermediate structure shown in FIG. 5d.

FIGS. 5e and 5f amplify FIGS. 5c and 5d respectively to show that the CWCV stiffeners may be formed without viscoelastic materials in the "feet" to promote good bonding and strength.

As stated above, the examples of FIG. 5 are basic building blocks for damped panels, beams, surfaces, and structural members. FIG. 5 shows, only a few of the design combinations in the use of wavy composite laminates, CWCV plates, viscoelastic damping materials, mixed (if desired) with conventional composite or other materials. Any of the CWCV plates and/or combinations of materials shown in FIG. 3 could be used to make the four basic stiffener building blocks, and any of the exampled intermediate CWCV structures.

As shown in FIG. 6a (perspective view) a CWCV plate sandwiched core intermediate structural member would consist of a core (14), a structural laminate or a CWCV plate (7) shown with a (for example) sinusoidal wave form, and a second structural laminate or a CWCV plate (7) (no wave form shown), or, a special surface treatment or material.

The sandwiched core (14) could consist of one or more of the following: a) a honeycombed material (15) b) and/or (16) a structural foam, special core material for sound proofing, wood, or any other suitable core material(s) and combinations commonly used to provide form to the structure.

The plate (7) could consist of one or more of the following: a) one or more opposing wavy composite laminates constraining one or more damping layers of viscoelastic or anisotropic viscoelastic material, and/or b) a combination of wavy composite laminates, viscoelastic or anisotropic viscoelastic damping layers, and conventional composites or other suitable structural material, or any of the CWCV plates represented in FIG. 3.

FIGS. 6*b* & 6*c* show cutaway end views of only a few of the possible combinations of conventional, wavy composite laminates, and viscoelastic materials (not shown to scale), and are meant to elaborate on the structure shown in FIG. 16*a*.

The plate in FIG. 6*b*, could be composed of a conventional composite or other structural material (8) or another CWCV plate (7), and would thus represent the main load bearing member in the laminate.

The plate in FIG. 6*b* would also consists of one or more wavy composite layers (1 & 3) and damping layers (2). In one embodiment the laminates would consist of opposing wavy patterned wavy composite laminates (1) & (3), constraining viscoelastic or anisotropic viscoelastic damping layers (2). An alternative embodiment would have some of the laminates consist of wavy composite laminates, some would consist of conventional laminates or other suitable materials, all having the purpose of constraining one or more viscoelastic or anisotropic viscoelastic damping layers (2). Two wavy composite laminates are shown in FIG. 6*b* but it is possible to have any number of alternating layers of opposing wavy composite laminates, viscoelastic damping layers, conventional composites, anisotropic viscoelastic, or other materials, according to the design criteria of the engineer. As shown, the sandwiched core is joined directly to the load bearing member (7 or 8) promoting strength and good bonding. Of course the order of items 1-3,7 or 8 could be reversed where the load bearing laminate (7 or 8) was located on the outside of the core surface.

The plate in FIG. 6*c* consists of multiple wavy composite laminates (1 and 3) and damping layers (2). In one embodiment the laminates would consist of multiple wavy pattern wavy composite laminates (1) & (3), and would constrain multiple viscoelastic or anisotropic viscoelastic damping layers (2). Some of the wavy composite laminates would be of one pattern (1), with opposing wavy composite laminates (3). An alternative embodiment would have some of the laminates consist of wavy composite laminates, with some of conventional laminate or other material, constraining the viscoelastic or anisotropic viscoelastic damping layers (2). The plate sandwiched core could include conventional composites or other materials (Items 7 & 8) to provide additional strength. It is also possible to eliminate laminate (7 or 8) on the surface of the sandwiched core in FIG. 6*c* which would bond the viscoelastic material (2) or the wavy layer (1) directly to the sandwiched core. In this case the removal of the viscoelastic layer (2) could be accomplished. It is not necessary to have a viscoelastic layer in this case and the wavy composite laminate (7) could be directly bonded to the core material with adhesives.

As stated above, the examples of FIG. 6 are basic building blocks for damped plates, panels beams, surfaces, and structural members. FIG. 6 shows only a few of the design combinations in the use of CWCV plates laminated to various core materials.

FIG. 7 shows one of the many possible uses and combinations of CWCV building blocks (plates and stiffeners) and sandwiched core CWCV structures as discussed for FIGS. 3-6 above, in the design of aerodynamic structures (FIGS. 7*a* and 7*c*). FIGS. 7*a* and 7*c* show two such possibilities using a typical airfoil as an example. In FIG. 7*a* multiple CWCV hat-stiffeners (9) are combined with one or more CWCV plates (7) and joined together to form the airfoil. In FIG. 7*c* two CWCV plates (7) are applied to a sandwiched core (14) to form the airfoil and are reinforced by two C-channel CWCV stiffeners (or conventional stiffeners).

FIG. 7*b* shows a blown up view of a portion of the hat-stiffened CWCV airfoil of FIG. 7*a*. FIG. 7*b* makes use of a CWCV hat-stiffened intermediate structural member illustrated in FIG. 4*b*. Hollow spaces (18) in the airfoil could be left open for the passage of heated or cooling air, fuel, fluids, or coolant, or could be filled with sound deadening materials, structural foams or other materials depending on the requirements of the design. The above discussion illustrates one example of the use of CWCV basic building block concepts of FIGS. 3-6 used in aerodynamic structures; others will be obvious to one skilled in the art. Such CWCV aerodynamic structures could be used in wings, control surfaces, propeller blades, turbine blades, rotor blades, fan blades, and any other aerodynamic structure where damping, strength, and stiffness are important.

FIG. 7*d* shows a blown up view of a portion of the CWCV sandwiched core and C-channel stiffened airfoil of FIG. 7*c*. FIG. 7*d* makes use of both the C-channel stiffener building block illustrated in FIG. 5*c* and the sandwiched core of FIG. 6*b*. Hollow spaces (18) in the airfoil could be left open for the passage of heated or cooling air, fuel, fluids, or coolant, or could be filled in with sound deadening materials, structural foams or other materials depending on the requirements of the design. Such CWCV aerodynamic structures could be used in wings, control surfaces, propeller blades, turbine blades, rotor blades, fan blades, and any other aerodynamic structure where damping, strength, and stiffness are important.

As previously discussed, the basic building blocks shown in FIGS. 3 through 6 (and discussed above) can be used in any number of combinations to provide unique damping, strength, stiffness, and acoustic properties. Only two possible designs have been shown; others will be obvious to a person skilled in the art that such combinations would be possible and desirable in certain design situations. Thus it is not necessary to limit the designer to only one family of the many designs shown in FIGS. 3 through 6. For example, using high temperature matrix and damping materials in a fan blade would allow the use of CWCV materials in the construction of damped compressor and turbine fans. Cooling air would be passed through the airfoil spaces (18) as is done for conventional metallic fan blades and would control the temperature of the materials. Thus any of the basic designs of FIGS. 3 through 6 could be used in any combination to attain a desired structural characteristic.

The use of highly damped materials is beneficial in the building of virtually every structure. In civil structures the use of the CWCV building blocks of FIGS. 3-6 can provide both structural and damping performance not previously attainable. The same can be said for aerospace, automotive, and other structures where damping and structural dynamics are important.

FIG. 8 shows a few of the many possible uses and combinations of CWCV hat-stiffeners, I-beam stiffeners, and in the construction of larger panels, floors, beams, and structural members. FIGS. 8*a* through 8*e* show several such possibilities. There are many ways of making panels or floors from the various CWCV building blocks (e.g. CWCV plates and stiffeners). FIG. 8*a* shows a typical aircraft floor composed of CWCV I-beams from FIG. 5*a* coupled to a conventional floor plate or a CWCV plate from FIG. 3. FIG. 8*b* adds an additional conventional or CWCV plate for added stiffness. FIG. 8*c* makes use of CWCV plates from FIG. 3 and various combinations of CWCV hat-stiffeners from FIG. 4. Any combination of the CWCV plates (FIG. 3) or stiffener building blocks (FIGS. 4-6) can be used to construct these highly damped panels. The examples in FIG. 8 are shown with a flat shape, but these same combinations can be formed in any number of geometric shapes.

There are many more possible combinations of CWCV laminates, stiffeners, core materials, etc. that will be obvious to one skilled in the art.

Skis, snowboards, water skis and other sports equipment can benefit from the addition of structural materials with inherent damping as represented by the use of CWCV building blocks. For example, downhill racers rely on the dynamics of their skis ability to provide solid contact with the ground and maintain control. Skis that chatter are a hazard. Skis with inherent structural damping are therefore of great value to the sport.

FIG. 9 shows an example of one of the many possible uses of CWCV structures in the design of skis, snowboards, etc.

As shown in FIG. 9a (perspective view) a CWCV enhanced ski would consist of a CWCV plate (7) covered core (14) shown with a (for example) sinusoidal wave form. The core (14) could consist of any of the materials discussed in FIG. 6 above such as honeycomb, foam, wood, etc. The core is strengthened by the addition of a CWCV plate (7) which can consist of any of the examples discussed in FIG. 3, and strengthened by the addition of any of the basic CWCV stiffeners or other intermediate structures as discussed in FIGS. 4-6. Metallic (or other suitable material) edges (19) would be bonded to the CWCV wrapped core. Typically a special plastic or other material is bonded to the bottom of the ski (20) to provide protection to the ski and to give the ski special surface properties for better performance. Likewise a protective coating is applied to the top and sides of the ski (21) to provide protection to the core structure.

FIGS. 9b through 9d show cutaway end views of examples of the use of CWCV plates and other materials in the design and construction of a ski. In general, the combinations of conventional and CWCV plates (FIG. 3), shown in FIGS. 9b-9d mirror the possible combinations discussed in conjunction with FIG. 3. The various combinations of wavy composite laminates (1 and 3) combined with viscoelastic material (2), conventional laminates or isotropic materials (8) and special protective surface materials (21) can be arrayed as shown depending upon the dynamic properties desired.

Figure 10B:
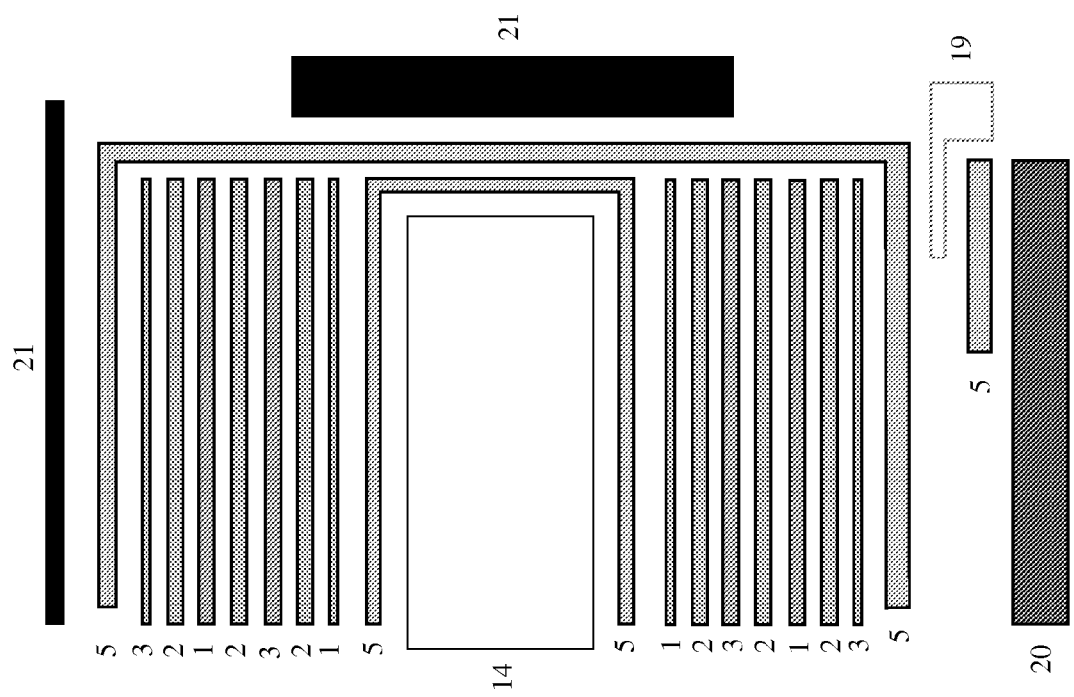
Figure 10A:
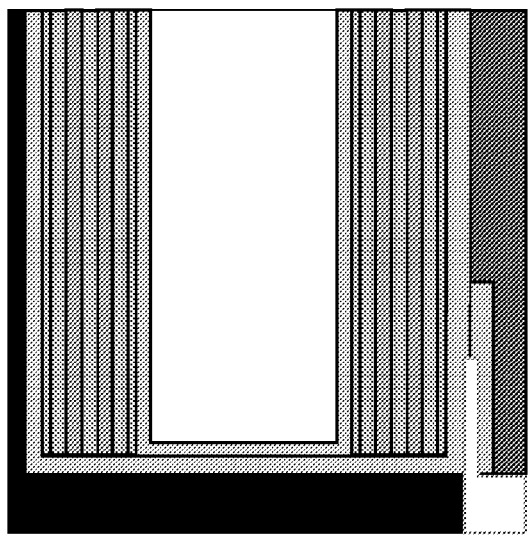

Two specific examples of skis that have been built using CWCV plates and conventional materials are shown in FIGS. 10 and 11. The ski discussed in FIG. 9 is shown in FIG. 10 assembled (FIG. 10a) and in exploded view in FIG. 10b. In FIG. 10 conventional laminates "packs" (8) were replaced by combinations of wavy composite (1) viscoelastic layers (2) and opposing wavy composite laminates (3). Torsional rigidity was provided by the ±45° bi-directional composite cloth (5). The combination is laminated on to the core (14) and enveloped by protective coatings (21) and cured in the standard manner.

Figure 11B:
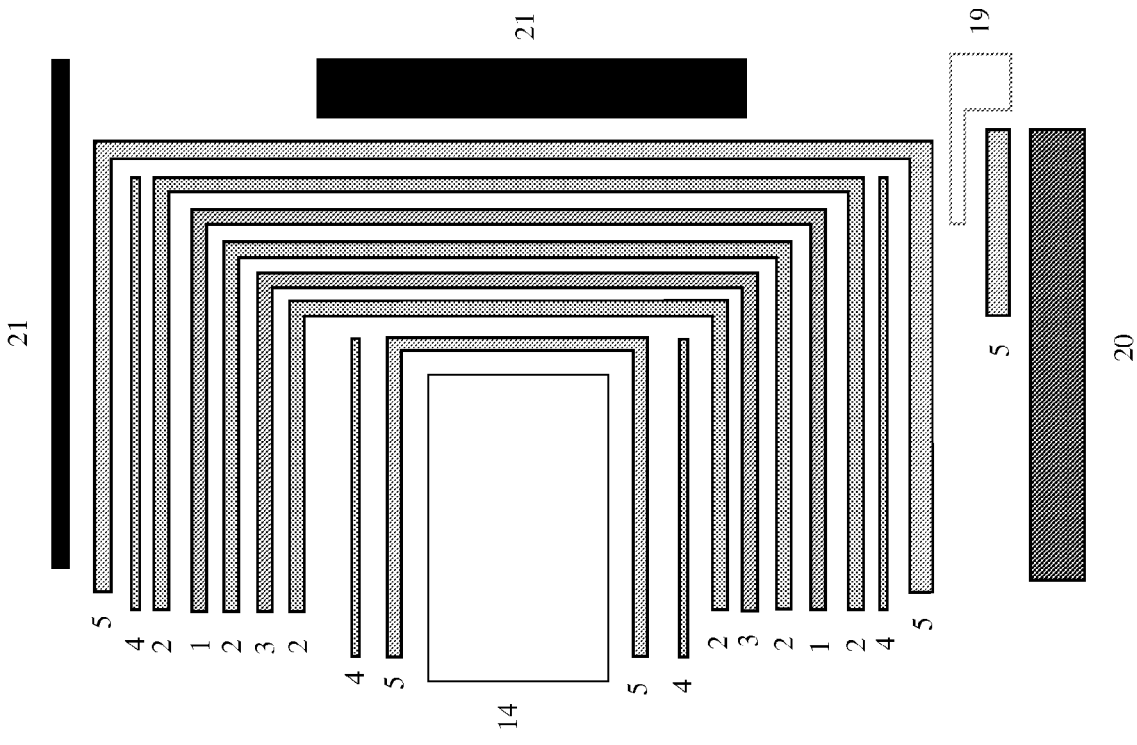
Figure 11A:
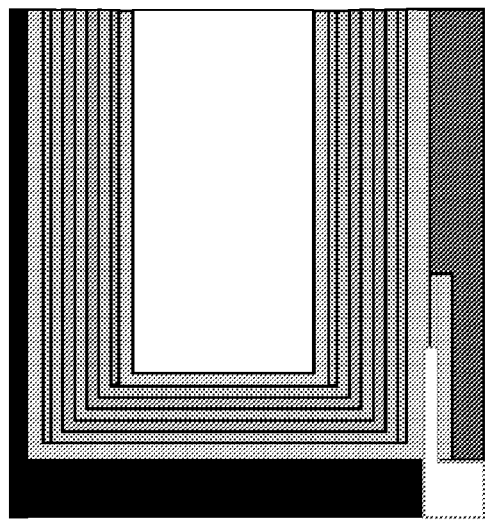

An alternative embodiment of the ski shown in FIG. 10 is represented in FIG. 11 shown assembled (FIG. 11a) and in exploded view in FIG. 11b. As shown in FIG. 11 the basic structure discussed for FIG. 10 applies in this figure as well, except that the alternating layers of viscoelastic (2) and wavy composite laminates (1 & 3) are wrapped around the bi-directional cloth-covered core (14). The scaling shown in FIGS. 9-11 are exemplary of a few of the many assembly methods available to the designer. By varying the amounts of unidirectional (4) and woven composites (5) and CWCV plates (7) consisting of wavy composite layers (1 and 3) and viscoelastic layers (2) it is possible to "tune" the dynamics of the ski.

There are many other combinations of viscoelastic or anisotropic viscoelastic materials, and conventional composites, special coatings, or other materials which can be used to design and build the ski, and will be obvious to one skilled in the art.

For example, in the case of the water ski, it may be desirable to eliminate the metallic edges (19) and the special covering for the bottom (20) or the top & sides (21). In this case, the wavy composite laminates on the surface would provide the aesthetic covering as well as the damping and structural properties of the ski.

The example CWCV ski structures discussed above could be used for snow skis, snow boards, surf boards, slalom skis, beams, boards, and many sports equipment or structural components where damping, strength, and stiffness are important.

A CWCV tube can be made from the basic CWCV plate building block (7) discussed for FIG. 3. Although the basic structure shown in FIG. 12e was contemplated by Dolgin, the use of stepped CWCV plates (7) as shown in FIGS. 12f and 12g was not. Neither was the use of the non-sinusoidal waveforms of FIG. 2. The use of the concepts in FIGS. 1 and 2 and 13-15 in the design and the manufacture of tubular structures can provide damping and reinforcement to diverse structural components such as concrete pillars, pilings, beams, and foam or other cored structures. For example, the use of wavy composite bi-directional cloth where the fill fibers are straight and the wavy fibers are oriented as in FIG. 12a will provide containment, damping, and structural reinforcement for a concrete beam or column. The use of CWCV structural reinforcement and damping will provide additional safety margin, survivability, and increased service life to a concrete structure. It is well-known that the use of composite materials as a surface treatment for standard concrete structures is highly desirable and becoming more common. None of the current methods, however, add inherent damping to the structure.

The CWCV tubes shown in FIGS. 12b through 12g can be used in the manufacture and improved dynamics of sports equipment as diverse as golf club shafts, arrow shafts, tennis rackets and similar devices, baseball bats and similar devices, poles, shafts (such as helicopter and automotive drive shafts), antennae components, bicycle components and frames and fishing rods.

The tubular examples of FIG. 12 are shown with a round cross section but any cross section can be used including elliptical, square, rectangular, polygonal, aerodynamic, or even a special irregular shape or combination of shapes designed to optimize structural parameters. The tubular examples of FIG. 12 are also shown of constant and uniform cross section throughout the length of the tube. Of course it is possible to taper the tube, bend the tube in any reasonable shape, or even create an irregular taper and shape along its length depending on the application. It is a common practice to construct a tube on a straight mandrel (for example) remove it prior to curing, place it in a curved mold, and form curved tubes of constant or variable cross section and shape. Such a process would be used in the manufacture of a CWCV damped tennis racket (for example). Of course any of the material combinations discussed in conjunction with FIGS. 1 and 2, 3-6, could be used in the manufacture of a CWCV tube.

A single layer of wavy composite has a fiber lay that oscillates between a negative maximum angle and a positive maximum angle in a pre-determined pattern. As a result, the individual laminae will vary in stiffness and displacement characteristics along its length as the angle of the fiber changes. Thus where the angle is 0° relative to the length of the waveform, the laminae will have the characteristics of a 0° unidirectional composite, and where the angle diverges from 0° the laminae will have the characteristics of an off-axis unidirectional laminae. If several opposing wavy composite laminae (1 and 3) are joined together in a symmetric lay-up (see FIG. 13), the laminate will exhibit quasi-isotropic properties at any point along the length.

Refer to FIG. 15 which shows various combinations of opposing pairs of wavy composite laminae (1 and 3). Where the angle is at a ± maximum (25), the properties of the laminate will be like a ± unidirectional crossply. These areas where the angles are at a ± maximum will resist in-plane shear loads effectively but will have a lower longitudinal or lengthwise stiffness. Where the angle is at 0° (23) the laminate will have the properties of a 0° unidirectional lay-up (Pratt, 1999). These areas (where the angle of the fibers is 0° relative to the longitudinal direction) will not resist shear loads effectively but will have a greater lengthwise stiffness. These localized differences in stiffness can be overcome by combining two pairs of wavy composite laminae into a single laminate as is shown for item 17. The structure of the wavy laminate enclosed by item 17 is hereafter termed "wavy crossply laminate."

Thus, for one pair of opposing wavy laminae, the angle will be at a ± maximum but the second pair of opposing wavy laminae will have a fiber angle that is at 0° or nearly 0° relative to the general direction of the laminate. This gives the laminate an equivalent unidirectional lay-up of four total layers where two of the layers are unidirectional plies with a ± fiber orientation, and the other two layers were equivalent to two 0° unidirectional laminae. The difference is that the construction of a unidirectional version of a crossply laminate cannot be easily automated; the construction of a wavy crossply laminate can be automated. In the process of characterizing the properties of damped wavy composites, several sample tubes constructed from wavy composite with constrained viscoelastic layers were compared to equivalent undamped unidirectional crossply tubes. It was found that damped wavy tubes took significantly less time to fabricate. As a result, and in an effort to save labor time, several undamped tubes were manufactured using the lay-up shown in FIG. 15, (1 & 3) (one pair) as a replacement for the undamped unidirectional tubes because of the ease with which wavy tubes could be fabricated. The realization of the superior handling, excellent stiffness and strength, and significant time savings led to additional discoveries which are the subject of reference 13 and are incorporated in this document.

Other crossply structures result when the pairs of opposing wavy composite laminates (1 & 3) are combined essentially at a 90-degree angle with respect to each other, creating a crossply structure (24). These crossply areas (24) can also be created by combining two wavy composite layers (1 & 3).

The following discussion further amplifies the advantages of using wavy composite pre-preg in wavy crossply lay-ups. FIG. 16 illustrates three typical crossply lay-ups that use several unidirectional pre-preg plies (4) to build a laminate with quasi-isotropic properties. In Reference 16, Rienfelder, et al showed how to construct a rotary wing spar using different materials and ply stacking methods and cited superiority of consolidation of the laminate, uniformity, and tailorability of the laminate combinations as advantages. They further cite the disadvantages of fiber winding techniques for this application as "relate[d] to difficulties associated with expanding/urging the fibers against the mold surfaces of the matched metal mold." It can be concluded that in some applications, fiber plies or laminae made from unidirectional materials cut off-axis will be preferable to the use of fiber winding methods and that continuity of fibers of such plies will be interrupted. The authors state that such plies were butt-joined together and that such joints from additional plies above and below in the stacking sequence were offset so that adjacent butt-joints would not coincide.

This concept is shown in general in FIGS. 17 and 18. Pre-preg made with unidirectional pre-preg (4) comes in finite widths, typically up to 1.5 meters in width, in very long lengths. The same is true with cloth pre-preg (5), and wavy composites (1 and 3). Because of the limited widths of pre-preg, there is a finite length of off-axis material that can be cut from a roll of unidirectional pre-preg. In FIG. 17, several unidirectional plies (4) are cut from a long continuous sheet of unidirectional material. The plies are then butt-joined (26) and overlapped (27) with other plies from the same cut of material. The weakest link in the laminate is the seam between butt-joined plies (26) where fiber continuity is interrupted. Thus to obtain a viably strong laminate with an off axis orientation, a minimum of two laminae are required.

Wavy composites do not have this limitation. As shown in FIG. 17, two or more plies (1) of wavy pre-preg can be placed adjacent to each other to create a wider laminae (1). When using concepts shown in FIG. 15, the wider wavy laminae can be combined in different ways to form a laminate with the desired properties. To further amplify the advantages of wavy composite, refer to the discussion concerning FIGS. 3 thru 6.

In order to make a crossply laminate from unidirectional pre-preg similar to concepts shown in FIG. 16 with a ply stacking sequence of 0°/+45°/−45°, it would be necessary to cut the off-axis plies as shown in FIG. 17 items 28 or 29. Several such plies would be butt-joined and overlapped as shown in FIG. 18 items 26 and 27. While the 0° ply (item 28 or 29) is continuous in this drawing, there are significant interruptions of fiber continuity in the off-axis plies. All of this is typically done by hand and is very labor intensive.

If, however, the designer were to use wavy composite, the equivalent of the 0°/+45°/−45° laminate could be completed using wavy plies offset as shown in FIG. 15 item 17. If hand labor is used, the steps required to accomplish the desired laminate are greatly reduced. Instead of having to cut separate laminates as shown in FIG. 17, items 28 or 29, the fabricator uses successive wavy layers of any desired length to form the wavy crossply laminate. In fact, it is very possible for this process to be automated by feeding (for example) four spools of wavy composite through a pair of pinch rollers with the patterns offset appropriately, to create a continuous roll of wavy crossply as shown in FIG. 15, item 17. The beginnings of such a process are shown in FIG. 18 (bottom) where the second wavy composite layer (3) is overlaid on the first layer (1). FIG. 18 shows the next layer of wavy composite (3) offset to the right of the base layer (1) for clarity. In actual practice both layers (1 and 3) could begin at the end; this figure is only illustrative of the concept. Of course there are many methods and mechanism whereby wavy layers can be combined to form wavy crossply laminates including successive passes by a single axis laminator, multiple feed rolls, etc., and even manual labor methods. All will be significantly easier and more economical than current methods of producing unidirectional pre-preg based crossply laminates.

The present invention includes a structure such as is shown in FIG. 13 where several layers of wavy composite (1 and 3) are used to build a "balanced" wavy composite laminate.

The present invention also includes a laminate consisting of a mix of wavy composite layer(s) (items 1 and/or 3) and unidirectional layers (4) as shown in FIG. 14. In this figure the laminate consist of two opposing wavy layers (1 and 3) and one transverse unidirectional ply (4). This is a very lightweight, efficient lay-up that has been used to produce undamped tubes with excellent stiffness and improved strength properties. It has been found, that the lamination of at least one transverse ply (4) and at least one wavy ply (1 or 3) provides greater strength. When a single layer of wavy composite is pulled to failure (along the strong or longitudinal axis), the failure generally occurs in the matrix where the angle of the fiber is at a ± maximum. The matrix splits between the fibers. If fibers are added generally perpendicular to the wavy fiber lay, then the laminate failure occurs at a much high stress level because the transverse fibers resist the transverse stresses efficiently. It is also possible to orient two or more wavy layers transversely to each other as is shown in FIG. 15 item 4. Such a laminate structure would be useful in providing quasi-isotropic properties to sculpted surfaces where special properties or laminating issues are important.

The most useful configuration is shown as items 17, 24 in FIG. 15. Item 23 represent pairs of opposing wavy composite laminae joined together to form a crossply wavy area (17). The two (or more) wavy laminates (23) or (1 & 3) need not "oppose" each other (e.g. have a one-half waveform phase lag or offset) to conform to the meaning of the present invention. It may be useful to cause a more or less than half waveform phase lag as demonstrated in the area enclosed by item 17 of FIG. 15.

Combining two or more "pairs" of wavy laminae need not be joined together along their longitudinal axes but may be laid at some off-axis angle with respect to each other as is shown in FIG. 15, (item 24). This will give a unique crossply effect as shown in the area enclosed by item 24. Although the pairs of wavy laminates (23) are shown essentially perpendicular to each other, it is also possible to vary this angle more or less to accomplish unique laminate properties. For example, it may be desirable to place the pairs of wavy laminates at a ±30° angle or some other angle with respect to a reference line as is commonly done with unidirectional plies. These different angular orientations are contemplated by this invention.

To further illustrate the capability of wavy crossply laminates, the following table documents the equivalent axial stiffness of several different configurations of wavy crossply laminates using (for example) a typical carbon fiber-resin combination to represent the material properties of both unidirectional and wavy composite. Table 1 shows the configuration of each laminate. Each laminate is defined by the words "unidirectional", or "wavy crossply", or "wavy crossply & unidirectional" defining the materials used in the lay-up. This is shown in the "Laminate" column of the table. The laminate configuration is further defined by the angle of the plies relative to the longitudinal direction of the sample tube used to model the lay-up. This is shown in the "Configuration" column of the table. For example, "0°" means all fibers are oriented at zero degrees to the reference, or run longitudinally in the tube. The relative axial stiffness of the laminate is given in the column labeled "Axial modulus." This represents the smeared axial material properties of the lay-up. Axial modulus represents the relative ability of the laminate to resist tension or compression loads, and even bending loads if the neutral axis shear forces are ignored. The "Shear modulus" column represents the ability of the laminate to resist torsion or shear loads.

TABLE 1

| Laminate | Configuration | Axial modulus | Shear modulus |
| --- | --- | --- | --- |
| 1. Unidirectional | 0° | 142.2 GPa | 5.2 GPa |
| 2. Unidirectional | +30°/−30° | 51.4 GPa | 29.2 GPa |
| 3. Unidirectional | 0°/+30°/−30° | 84.3 GPa | 21.5 GPa |
| 4. Wavy crossply | ±30° wavy (one pair) (FIG. 15, item 5 or 6) | 82.4 GPa | 12.6 GPa |
| 5. Wavy crossply | ±45° wavy (two pair) with quarter waveform offset between pairs (FIG. 15, item 7) | 53.9 GPa | 27.5 GPa |
| 6. Wavy crossply & Unidirectional | ±30° wavy (one pair) with a 90° unidirectional transverse ply (FIG. 14) | 72.6 GPa | 10.9 GPa |
| 7. Wavy crossply | ±30° wavy (two pair) with quarter waveform offset between pairs (FIG. 15, item 7) | 88.6 GPa | 20.0 GPa |
| 8. Wavy crossply & Unidirectional | ±30° wavy (two pair) with quarter waveform offset between pairs, with a 90° unidirectional transverse ply (FIG. 14 and FIG. 15 item 7 combined) | 73.7 GPa | 16.0 GPa |
| 9. Wavy crossply & Unidirectional | ±30° wavy (two pair) with quarter waveform offset between pairs, with one 0° unidirectional ply. | 98.0 GPa | 17.8 GPa |

Laminate 1 is a unidirectional fiber composite lay-up that shows the 0 degree properties of the fiber reinforce composite used to model all subsequent lay-ups. Laminate 2 shows the properties of a conventional ±30 degree unidirectional composite crossply lay-up. Note that the equivalent axial modulus of laminate two is considerably reduced from that of laminate 1, but the equivalent shear modulus is greatly improved over the shear modulus of laminate 1. This is a classic example of how crossply composites lose axial modulus rapidly as the angle of the fiber diverges from zero degrees, but their ability to resist shear loads improves.

As discussed above and shown in FIG. 18, a unidirectional crossply laminate is difficult to fabricate with automated means. However, as shown in Table 1 (laminate #2), crossply laminates are useful in providing resistance to both axial and shear loads. If more axial stiffness is required, a unidirectional 0 degree ply can be added. The results of this combination are shown as laminate #3 in Table 1. The axial modulus is improved by 64% relative to laminate #2 but the shear modulus is reduced 26%.

Wavy composite can be used to create wavy crossply laminates equivalent to the unidirectional crossply laminates discussed above. Wavy crossply laminate #5 is equivalent in both axial and shear modulus to unidirectional crossply laminate #2. Likewise, wavy crossply laminate #7 is equivalent in both axial and shear modulus to unidirectional crossply laminate #3. Both wavy crossply laminates are significantly easier to fabricate, do not cut fibers (and therefore do not show any seam), and can be readily automated. The same cannot be said for the two unidirectional crossply laminates.

The remaining entries of Table 1 example only a few of the many different combinations possible by using wavy composite materials. For example, wavy crossply laminate #4 represents the axial and shear modulus of one pair of opposing wavy laminae (17). This combination has a 60% greater axial modulus than the ±30 degree unidirectional crossply lay-up (laminate #2) but a 57% lower shear modulus. It is exampled here because it represents the simplest wavy crossply laminate. Obviously, it is possible to modify the characteristics of the laminate by changing the waveform, offset, or by orienting the wavy laminae off-axis. This example represents only one combination of parameters and their effects on the stiffness of the laminate thus created.

If greater transverse strength was desired in the crossply laminate, the designer would add an additional layer of unidirectional composite. This is shown in laminates #6 which is a modified version of #4, and in laminate #8 which is a modified version of laminate #7. Both can still be readily automated in fabrication since the 90 degree layers could be added easily. Additionally, 0 degree unidirectional layers can be added to augment the axial modulus without unduly sacrificing the shear modulus. This is shown as laminate #9 in Table 1 and compares favorably with laminates 3, 7, and 8.

The present invention does not limit the waveforms used to identical wave patterns, periods, to a particular waveform (such as a sine wave, cosine wave, etc.), a particular orientation, or to a particular offset. The properties desired in the laminate may require a non-periodic waveform or a combination of waveforms of any type, and unidirectional or woven cloth laminae. The selection of waveforms, materials, orientations, or offsets to use will depend on the properties desired in the laminate. The selection will be obvious to one skilled in the art. The wavy laminates discussed here and illustrated in the figures are for example purposes only.

Finally, the range of possible uses of the example wavy crossply lay-ups shown in Table 1, is potentially limitless. In Reference 10, a construction for a rotary wing spar is revealed which uses unidirectional and woven fiber composite layers to provide efficient axial, bending, and torsional stiffness. Although the examples of Table 1 were based upon the analysis of a sample tube, the same or similar wavy composite lay-ups could be used to construct an equivalent spar at a greatly reduced costs. Other applications include automotive, aerospace, and marine drive shafts, composite wing structures of all types, panels, composite I-beams, channels, and virtually an endless combination of possibilities. Composite arrow shafts and golf club shafts would likewise benefit from greatly reduced labor costs in construction. Other applications will be obvious to those skilled in the art.

By combining the concepts shown in references 10, 3, and 4, it is possible to create a lightweight, damped, golf club shaft that improves "feel", dramatically reduces free vibrations, widens the "sweet" spot on the club head, and reduces shock to the user's anatomy.

Refer to FIG. 15. In the preferred embodiment, major stiffness in axial, bending, and torsion in the golf club shaft (or other tubular structures) is provided by two pairs (or more) of opposing and offset wavy composite laminae as shown in FIG. 15, item 17.

The structure shown in FIG. 20 is useful in that the transverse unidirectional fibers (4) strengthen the wavy composite against premature failure. Failure occurs in the wavy layers generally when the loads applied to the structure exceed the rupture strength of the matrix where the angle of the Wave is at a ± maximum. By adding additional layer(s) of transverse fibers this type of failure can be avoided while preserving the damping characteristics of the wavy composite structure.

If greater damping, stiffness, or strength is desired, it is possible to place intermediate "welds" by removing viscoelastic material (2) from key areas of the laminate as shown in FIG. 21, Item 30. Removing viscoelastic material (2) from these areas shortens the effective length of the damping area and allows better coupling of the dynamic loads along the length of the structure. These intermediate "welds" also dramatically improve out-of-plane twisting of plates, skis, and plate-like structures made with wavy composite. Likewise, the torsional resistance of tubular structures is improved by periodically removing viscoelastic material (2) from between constraining layers (1,3,4).

If wavy crossply structure (17) is combined with one or more viscoelastic layers (2) and one or more constraining wavy composite layer (1 or 3), the result is a lightweight golf club shaft with high damping and excellent bending and torsional stiffness. Additionally, the wavy fiber composite has an aesthetically pleasing look which in good daylight seems to shimmer and sparkle. Golf club shafts can be constructed entirely from wavy composite and viscoelastic damping materials. The primary bending and torsional load resistance is provided by a wavy crossply structure; damping is provided by two viscoelastic layers and two double ply wavy composite constraining layers, as shown in part in FIG. 1. The overall construction of the golf club shaft is shown in FIG. 22.

As seen in FIG. 22*b*, the wavy fiber lay runs the length of the golf shaft that is preferably tapered. The generalized laminate structure is shown in cross section in FIG. 22*a* where Item 1 represents one layer of wavy composite of one pattern, Item 3 is an opposing wavy layer, Item 2 is the viscoelastic damping layer(s), and Item 31 is the main load bearing part of the shaft. Item 31 is preferably made from four or more wavy layers (1) arranged in a wavy crossply scheme (17). It is also possible to construct the load bearing portion of the shaft (31) from conventional unidirectional laminates or isotropic materials. At the handle and tip ends (10), the two layers, (1) and (3) are bonded together by removal of the viscoelastic layers (2) to provide additional load coupling to the load bearing layer (31). These methods of removing the viscoelastic from between the wavy layers or wavy layer and load bearing structure are generally termed "welds". Additionally, in these "weld" areas (10), the viscoelastic can be replaced with wavy, unidirectional, or cloth composite to provide additional strength and load resistance as shown and discussed for the concepts shown in FIG. 21.

Other methods of construction of the damped wavy golf club shaft are possible including but not limited to progressively welding the various viscoelastic, layers, rearranging the order of layers, or adding or subtracting additional layers of viscoelastic, wavy constraining layers, or load bearing layers, as shown in FIG. 12 and discussed in Reference 10. The characteristics of the structure can be modified by interposing unidirectional or multidirectional materials in the load bearing layers (31) as shown in FIG. 14, and discussed in Reference 10. Damping and stiffness characteristics can be modified by the addition of unidirectional or bi-directional materials in the structure of the constraining layers as shown in FIGS. 20 and 21. The minimum structure for a golf club shaft dampened with a wavy composite layer is a shaft or load bearing member (31), such as a steel or composite shaft, with at least one viscoelastic layer (2) affixed to the surface of the shaft (on the inside or outside) wherein the viscoelastic layer (2) is constrained by at least one sinuous wavy composite layer (1) attached to the viscoelastic layer (2) on the side of the viscoelastic layer (2) that is opposite to the side of the viscoelastic layer (2) adjacent to the shaft (31).

The structure of the golf club shaft shown in FIG. 22 resulted in a capable and lightweight shaft that provides less club head "flutter", a wider "sweet spot", greatly reduced vibration, and reduced shock transmission to the user. The wider "sweet spot" is due to the reduction of lateral and torsional vibration magnitudes of the head during contact with the ball. Typically the "sweet spot" on a club head is the approximate size of a quarter. Contact in this area of the club head with the ball, results in a greater transference of energy to the ball on a conventional golf club. Striking the ball outside of the "sweet spot" results in significant loss of energy transference on a conventional club, and greater shock to the user. The prototype club made from a shaft as shown in FIG. 22 had no discernable limits to the "sweet spot". Thus, the construction of a golf club with this improved shaft results in greater consistency, energy transference, with a resultant increase in range, and accuracy. The reduction in shock transference to the user is another benefit of this shaft structure. In conventional shafts, this ringing of the golf club after impact induces sympathetic ringing in the hands and arms of the user and can cause damage in the long term, similar to "tennis elbow" and other repetitive type injuries. A golfer who anticipates the "sting" of the swing will be reluctant to hit the ball normally and will have a tendency to "pull" the swing, with subsequent reduction in range, and loss of accuracy and consistency.

The structure of the golf club shaft can easily be extended to the production of baseball bats and similar devices where, for example, the overwrapping of the handle and part of or all of the barrel would provide both additional strength and resistance to splitting (for wooden bats). Additionally, the dramatic reduction in resonance amplitudes and duration after impact will reduce or eliminate the "sting" often associated with off-sweet spot hits. For metal bats or bats made from composite, this wavy composite damping concept can be added to the interior of the bat during construction or exterior during retrofitting. In this case, experience has shown that the reduction of vibrations and sting is likewise very apparent.

The preferred configuration for a wooden bat is to wrap the handle from about one inch from the butt end to a point approximately 18 inches from the butt end. The first four layers of wavy composite would be two pairs of opposing wavy composite with one pair offset from the other pair by a quarter wavelength as shown in FIG. 15 item 17. If damping was not desired and only reinforcement of the bat handle was desired, the four layers of wavy composite (17) would provide the necessary reinforcement to prevent the handle from breaking. If damping is desired, wavy damping layers (1) would then be added using opposing pairs of wavy composite (1 & 3) combined with viscoelastic (2) as shown in FIG. 22 and discussed for the golf club. Only one damping laminate (1 & 2) would be required but damping would be half of that of a pair of opposing wavy damping layers.

The preferred configuration for a hollow metal bat would be to affix the wavy composite damping and reinforcement layers (7) to the inside of the bat by wrapping an expanding mandrel with wavy composite layers (1 & 3) and viscoelastic (2) in as many opposing pairs (1 & 3) as desired, insert the mandrel into the barrel end of the bat, expand the mandrel, and cure the wavy composite-viscoelastic damping layers (1-3) inside the metal bat. This preferably would happen in the first 18 inches of the handle (from the butt end) since this is the area where most of the vibrations that "sting" a batter occur. If reinforcement is desired, crossply wavy layers (17) could be added to the damping layers (7) and the mandrel inserted as previously discussed. In this manner, the reinforcing layers of wavy crossply material (17) would be next to the metal on the inside of the bat, and the damping layers (7) towards the interior of the hollow bat. For retrofits to existing metal bats, the handles could be wrapped as was discussed for the wooden bats.

The structure of the golf club shaft can easily be extended to the production of fishing rods by simple scaling. The benefits would be the reduction of tip resonance and magnitude of vibration which causes the lure to have an unnatural movement.

This structure can be applied to the production of highly damped gun barrels where Item 31 of FIG. 22 would include a metallic liner for the rifling and wear resistance to the travel of the projectile through the tube. The obvious benefit is the reduction of "barrel slap" where the barrel vibrates as the projectile travels the length of the tube. This is a major source of projectile dispersion in large gun tubes. These benefits will also be evident in the use of these damping concepts on rifles. Likewise the use of these methods in the production of arrow shafts would result in greater accuracy and consistency.

While the structure of the golf shaft shown in FIG. 22 is tapered, there are many more applications where the cross section may be held constant or varied by some other criteria. The production of drive shafts of all kinds can benefit from this method of construction. By using the methods and concepts discussed above, it is possible to construct drive shafts for helicopters, automobiles, marine applications, and other high speed turning operations where resistance to torsional, bending, and the "super critical" modes are needed. The reduction of torsional vibration magnitudes reduces both the magnitude of stresses and strains experienced by the shaft; and reduces impact loading on gear boxes that may be attached. Prevention of the "super critical" mode of vibration where the bending frequency of the shaft matches the rotational speed of the shaft is the most pressing need in (for example) helicopter drive shafts. Both damping and stiffness are critical to prevention of catastrophic failure of the shaft in this mode. Avoidance of these failure modes is provided by the unique characteristics of the construction methods and concepts discussed above. Only the numbers of damping and constraining layers, and which material combinations are used will vary depending on the individual application and the expected loads.

These methods can be used to construct highly damped and capable boring bars for machining of deep cavities on lathes. Other machine tool components that would benefit from these methods include spindle extensions where resistance to both bending and torsional loading and reduction of resonance magnitudes is important to the prevention of chatter.

Likewise the use of these methods can easily be adapted to the production of oil drilling pipe where the damping and stiffness offered by the design shown in FIG. 22 would prevent the "pogo effect", and torsional chattering of the cutting head. In this application, both axial, bending, and torsional chatter can be prevented by this construction method, and drill pipe breakage or damage to the cutting head, in the hole can be avoided.

The production of larger tubular structures can be used to provide containment to reinforce concrete pillars, columns, and beams used in the construction of bridges, buildings, peers, pilings, and other civil structures. In addition to providing containment to the concrete (primarily from the unidirectional crossplies (4)), the damped wavy structure provides protection from the elements (especially salt and water corrosion of rebar), and most importantly, provides additional strength, stiffness and inherent damping to the structure. This would result in structures that would last for 75 years or more, provide survivability of the structure during earthquakes, and provide increased occupant comfort from natural sway and vibration in tall structures.

The concepts illustrated in the figures and discussed above need not rely solely on the use of waveforms that are oriented with the major axis of the tube or structure. Additionally, it is possible, with allowance for the differences in diameter of the laminate and a corresponding requirement to change the wavelength of the pattern, to place one or more of the waves (7) off-axis to the length of the mandrel, or tube. In this case careful planning and alignment of the waveforms is required to provide for matching of the opposing waveforms (FIG. 1) necessary for efficient damping performance. The waveform required for any particular layer will be a function of the effective diameter of the laminate in the structure, the previous waveform, and the off-axis angle of the laminate. This insures that the opposing waveforms in successive layers oppose each other properly throughout the thickness of the structure where the diameter and thus effective length of the off-axis orientation increases in proportion to the diameter of the laminate. The major advantage of an off-axis orientation of the wavy damping layers would be the increased efficiency, stiffness, and damping properties of the laminate for torsional loads.

The concepts illustrated in the figures and discussed above need not rely solely on the use of waveforms that are sinusoidal but may make use of any sinuous waveform that tailors the damping and stiffness of structure. As long as the minimum radius of the curvature of the wavy composite is not excessive (which would have a tendency to promote fiber breakage), the waveform may appear to have any useful sinuous shape. Additionally, all these designs contemplate the use of bi-directional composite cloth that has had the warp sinuously shaped (1), with the fill fibers (4) of the same fiber type or of a different type in various percentages of fill. The advantage of fill fibers in the wavy composite pre-preg is that it prevents premature failure of the laminate at the areas of maximum fiber angle. The stacking sequence of unidirectional (4) and wavy composites (1 & 3) is not important and variations in the stacking sequence will not alter the general advantages of the invention. Therefore any stacking sequence could be used.

The use of the methods and structures shown in FIG. 21 improves the out-of-plane twisting resistance, in-plane shear resistance, and load distribution of the CWCV laminates, plates, panels, and the various applications to which such structures are applied. Used in conjunction with the structures shown in FIGS. 3 through 12 such improved, damped laminates will better resist out-of-plane loads while preserving the damping advantages. Such structures can be beneficially used in the construction of skis where the twisting stiffness of the ski is greatly improved. In the case of hat stiffened panels, I-beams, and the various other shapes shown in FIGS. 4-9, the shearing properties of the web and twisting properties of the flanges and webs will be improved.

Any number of applications can benefit from these improved structures including but not limited to tennis rackets, javelins, sail masts and spars, panels, covers, satellite trees, launch shrouds, missile bodies, space station structures, truss structures of all types, wings, fuselages, car bodies, train bodies, robot arms, and a host of other applications where damping, strength, and stiffness are important.

The application of unidirectional plies crosswise (2) to the wavy composite (1 or 3) as shown in FIGS. 20 and 21 improve the ultimate strength of any wavy composite damping layers used in the various applications and figures discussed above. This benefit accrues because even low loads on unreinforced wavy laminates (1) can cause matrix failure along the direction of the lay of the fibers. Fibers laid essentially crosswise to the sinuous fibers (termed "fill" fiber layers), either through the use of a wavy woven structure or the use of a separate unidirectional fiber composite layer (4), will resist the separation of the matrix and fibers more efficiently. By varying the percentage of "fill" fiber layers, it has been shown that damping can be improved over a wavy composite structure with no "fill" fiber layers.

Other applications will be obvious to those skilled in the art.

INDUSTRIAL APPLICABILITY

The way in which the Improved Wavy Composite Structures are capable of exploitation in industry and the way in which the Improved Wavy Composite Structures can be made and used are obvious from the description and the nature of the Improved Wavy Composite Structures.

What I claim as my invention is:

1. A composite structure which comprises:
    at least one wavy fiber composite lamina (1);
    at least one unidirectional fiber composite lamina (4) combined, in any stacking sequence, with said at least one wavy composite lamina (1); and
    at least one viscoelastic layer (2) attached to a side of the combined said at least one wavy composite lamina (1) and said at least one unidirectional fiber composite lamina (4) and wherein said viscoelastic layer (2) is periodically removed across the width of the lamina (5).

2. A composite structure which comprises:
    at least one wavy fiber composite lamina (1);
    at least one viscoelastic layer (2) having a side attached to a surface of said at least one wavy composite layer (1), wherein said viscoelastic layer is periodically removed across the width of the lamina (30).

3. The composite structure as stated in claim 2, wherein:
    said viscoelastic layer is joined, along a side other than the side attached to said at least one wavy composite layer (1), to any structural material.

4. The composite structure as recited in claim 3, wherein:
    said structural material is an isotropic material.

5. The composite structure as recited in claim 3, wherein:
    said structural material is an composite material.

6. A composite structure which comprises:
    a first laminate comprising at least one wavy fiber composite lamina (1) and at least one unidirectional fiber composite lamina (4) combined, in any stacking sequence, with said at least one wavy composite lamina (1);
    at least one viscoelastic layer (2) attached to a side of said first laminate; and
    a second laminate comprising at least one wavy fiber composite lamina (3) and at least one unidirectional fiber composite lamina (4) combined, in any stacking sequence, with said at least one wavy composite lamina (3), wherein the wavy fiber composite lamina of said second laminate has a waveform opposing the wavy fiber composite lamina of said first laminate, and wherein said second laminate is attached to a side of said viscoelastic layer other than the side of said viscoelasatic layer that is attached to said first laminate; and
    wherein said viscoelastic layer is periodically removed allowing said first and said second laminates to combine.

7. The composite structure as recited in claim 6, wherein:
    said area between said first and said second laminate where said viscoelastic material is removed is filled with a composite material.

8. A composite structure which comprises:
- a first laminate comprising at least one wavy fiber composite lamina (1) and at least one unidirectional fiber composite lamina (4) combined, in any stacking sequence, with said at least one wavy composite lamina (1);
- at least one viscoelastic layer (2) attached to a side of said first laminate; and
- a second laminate comprising at least one wavy fiber composite lamina (3) wheein the wavy fiber composite lamina of said second laminate has a waveform opposing the wavy fiber composite lamina of said first laminate, and wherein said second laminate is attached to a side of said viscoelastic layer other than the side of said viscoelastic layer that is attached to said first laminate; and
- wherein said viscoelastic layer is periodically removed allowing said first and said second laminates to combine.

* * * * *